(12) United States Patent
Fukao

(10) Patent No.: US 11,663,760 B2
(45) Date of Patent: May 30, 2023

(54) NON-TRANSITORY COMPUTER-READABLE RECORDING MEDIUM HAVING STORED THEREIN DISPLAYING PROGRAM, METHOD FOR DISPLAYING, AND INFORMATION PROCESSING APPARATUS

(71) Applicant: FUJITSU LIMITED, Kawasaki (JP)

(72) Inventor: Jun Fukao, Ichinomiya (JP)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 17/181,070

(22) Filed: Feb. 22, 2021

(65) Prior Publication Data

US 2021/0335024 A1    Oct. 28, 2021

(30) Foreign Application Priority Data

Apr. 24, 2020    (JP) .............................. JP2020-077620

(51) Int. Cl.
| | | |
|---|---|---|
| *G06T 11/20* | (2006.01) | |
| *G06F 3/14* | (2006.01) | |
| *G06Q 10/0631* | (2023.01) | |
| *G06Q 50/04* | (2012.01) | |
| *G06Q 10/0875* | (2023.01) | |

(52) U.S. Cl.
CPC .............. *G06T 11/206* (2013.01); *G06F 3/14* (2013.01); *G06Q 10/06313* (2013.01); *G06Q 10/0875* (2013.01); *G06Q 50/04* (2013.01)

(58) Field of Classification Search
CPC ................................ G06T 11/206; G06F 3/14
See application file for complete search history.

(56) References Cited

U.S. PATENT DOCUMENTS 5,544,348 A * 8/1996 Umeda ................... G06F 30/20
703/17
2020/0210548 A1* 7/2020 Fukuda ................... G06F 30/17

FOREIGN PATENT DOCUMENTS

| JP | H09-107197 A | 4/1997 |
| JP | 2006-253184 A | 9/2006 |

* cited by examiner

*Primary Examiner* — Samantha (Yuehan) Wang
(74) *Attorney, Agent, or Firm* — Fujitsu Patent Center

(57) ABSTRACT

A non-transitory computer-readable recording medium having stored therein a displaying program for causing a computer to execute a process including; accepting production plans of a plurality of items; determining whether the plurality of accepted items are produced simultaneously or sequentially; when the plurality of items are determined to be produced simultaneously or sequentially, displaying a display component representing a material common to the plurality of items such that the display component indicates a time period containing the production plans of the plurality of items, and displaying display components associated with each of the plurality of items in a time period in which the display component representing the material is arranged.

20 Claims, 19 Drawing Sheets

EXAMPLE OF MANUFACTURING PLAN LIST SCREEN

FIG.5

| SEARCHING FUNCTION | | NON-ALLOCATED OPERATION | | | |
|---|---|---|---|---|---|
| ☑ FILTER DISPLAYING ☑ NUMBER DISPLAYING | | MANUFACTURING ORDER No. | MANUFACTURING ORDER SEQUENCE | MANUFACTURING ORDER SUB-SEQUENCE | ITEM CODE | PROCESS PATTERN |
| ─ITEM GROUP─ ▷ ☑ RESIN | | 00003004 | 0 | 1 | Item1001 | * |
| | | 00003005 | 0 | 1 | Item1002 | * |
| | 2 CASES | | | | | |

131 → (left panel)  132 → (table header)  130 (overall)

EXAMPLE OF NON-ALLOCATED OPERATION DISPLAYING AREA

FIG.6

| SEARCHING FUNCTION |
|---|
| ☑ FILTER DISPLAYING |
| ☑ NUMBER DISPLAYING |
| ☑ HIGHLIGHTING ON CHART |

ITEM GROUP
- ☑ RESIN
- ☑ CORE
- ☑ WIDTH
- ☑ NO CATEGORY
- ☑ NO GROUP

LINE RESOURCE
- ☑ DISPLAY NON-ALLOCATED MANUFACTURING PLAN

141

MANUFACTURING PLAN — 140

| ALLOCATION STATE | MANUFACTURING ORDER No. | MANUFACTURING ORDER SEQUENCE | MANUFACTURING ORDER SUB-SEQUENCE | ITEM CODE | PROCESS PATTERN |
|---|---|---|---|---|---|
| ALLOCATED | 00000003 | 0 | 1 | M-Item5001 | * |
| ALLOCATED | 00000004 | 0 | 1 | Item1001 | * |
| NON-ALLOCATED | 00000005 | 0 | 1 | Item1002 | * |
| ALLOCATED | 00000006 | 0 | 1 | Item1001 | * |
| ALLOCATED | 00000007 | 0 | 1 | M-Item5002 | * |
| ALLOCATED | 00000008 | 0 | 1 | Item1011 | * |
| ALLOCATED | 00000009 | 0 | 1 | Item1012 | * |
| ALLOCATED | 00000010 | 0 | 1 | Item1005 | * |
| ALLOCATED | 00000013 | 0 | 1 | M-Item5003 | * |

142

9 CASES

EXAMPLE OF MANUFACTURING PLAN LIST SCREEN

FIG.7
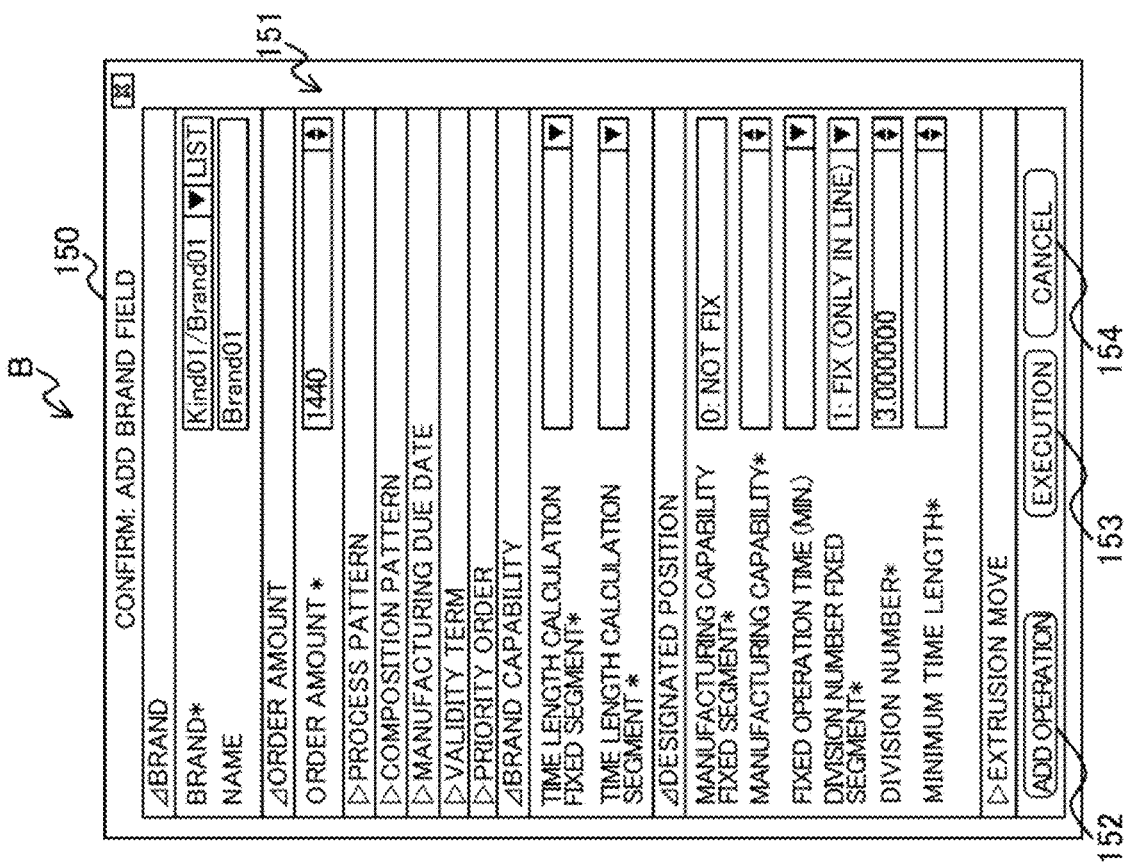
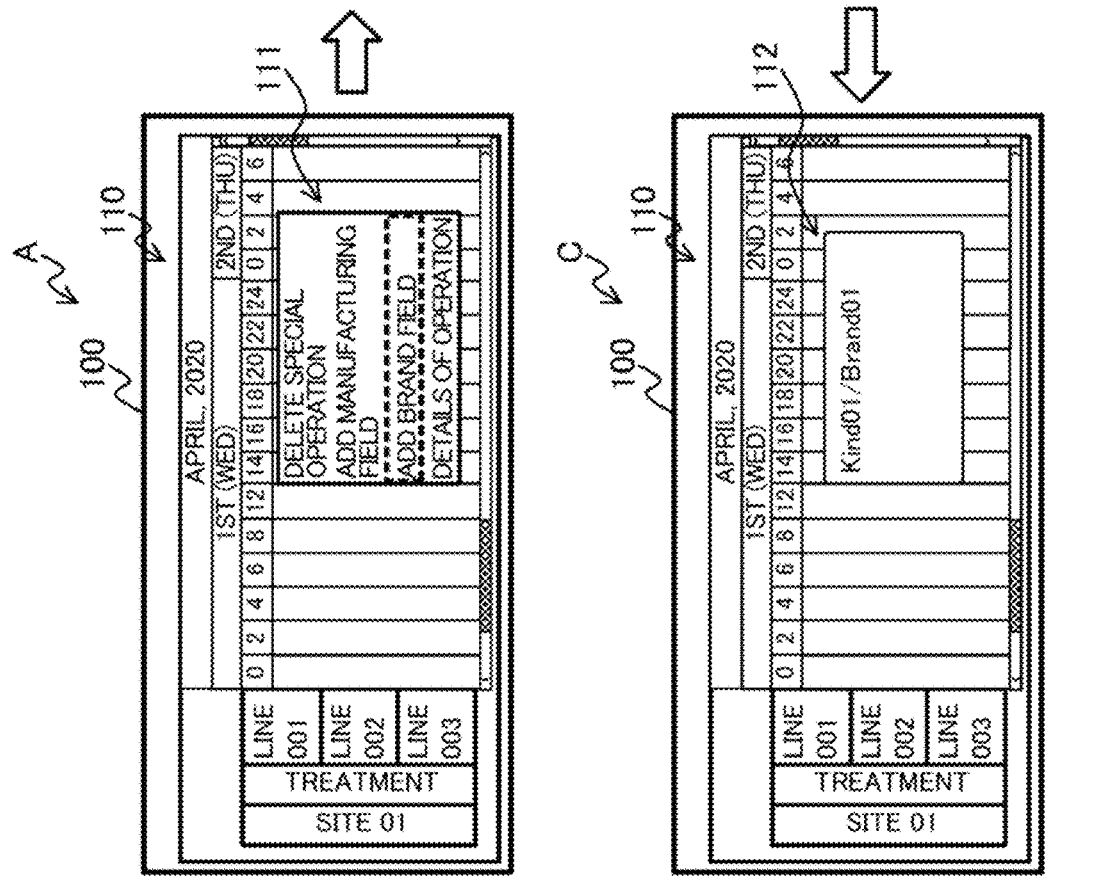

FIG.9 EXAMPLE OF MANUFACTURING ORDER RELATED INFORMATION

Figure 14:
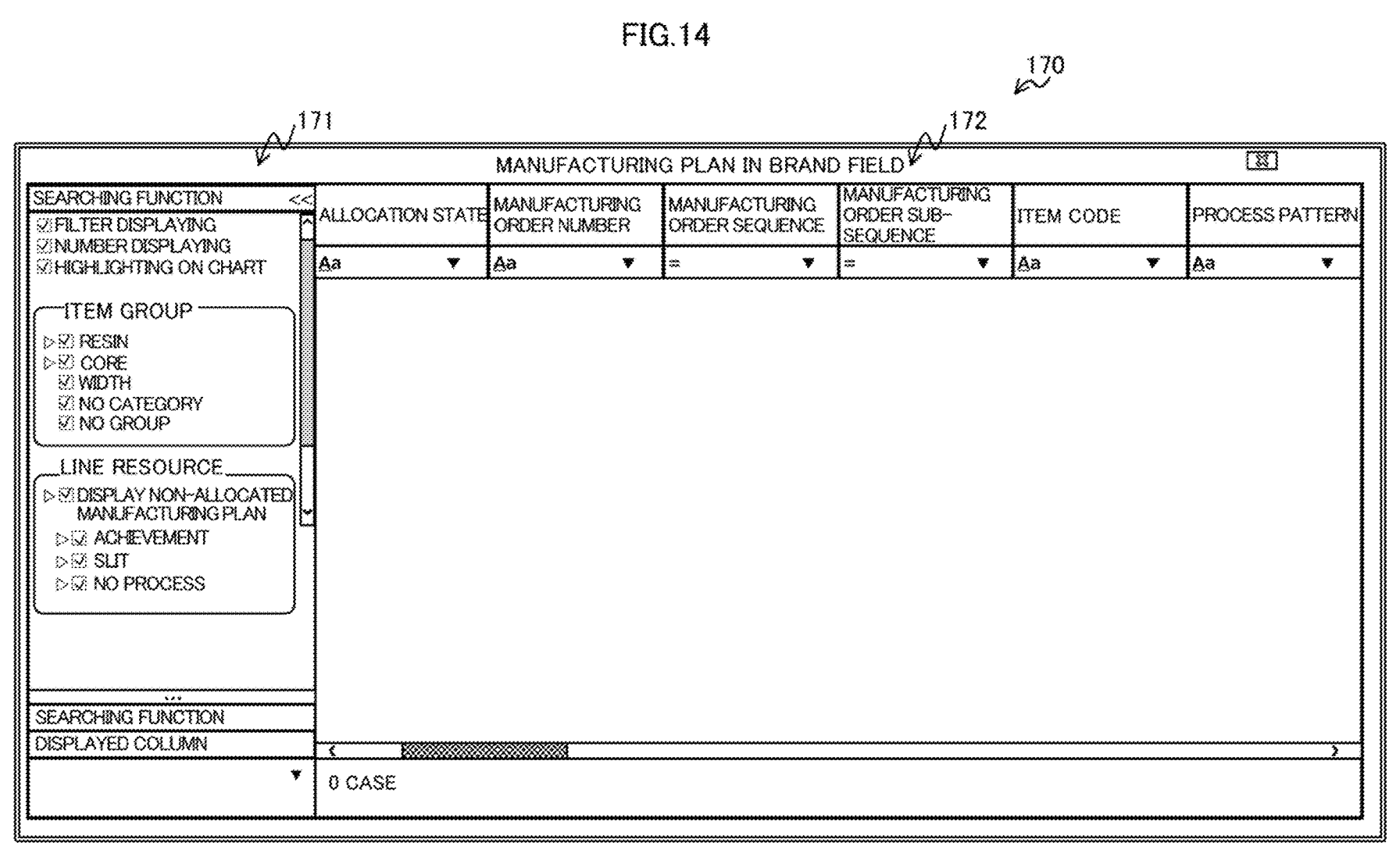

MANUFACTURING PLAN IN BRAND FIELD ~170

| ALLOCATION STATE | MANUFACTURING ORDER NUMBER | MANUFACTURING ORDER SEQUENCE | MANUFACTURING ORDER SUB-SEQUENCE | ITEM CODE | PROCESS PATTERN |
|---|---|---|---|---|---|
| Aa ▼ | Aa ▼ | = ▼ | = ▼ | Aa ▼ | Aa ▼ |

171 — SEARCHING FUNCTION
☑ FILTER DISPLAYING
☑ NUMBER DISPLAYING
☑ HIGHLIGHTING ON CHART

ITEM GROUP
△ ☑ RESIN
△ ☑ CORE
△ ☑ WIDTH
△ ☑ NO CATEGORY
△ ☑ NO GROUP

LINE RESOURCE
▷ ☑ DISPLAY NON-ALLOCATED MANUFACTURING PLAN
△ ☑ ACHIEVEMENT
△ ☑ SLIT
△ ☑ NO PROCESS

172 — SEARCHING FUNCTION
DISPLAYED COLUMN ▼

0 CASE

FIG.15

AUTO-ARRANGEMENT SETTING SCREEN 182

180

181 PREVIOUS EXECUTION

BASIC SETTING

ITEM
ITEM GROUP
LINE RESOURCE
MANUFACTURING PLAN
MANUFACTURING FIELD PLAN
PROCESSING SEQUENCE
CONSTRAINT

From
START 2020/04/01   00:00
END   2020/05/02   00:00

To
START 2020/04/01   00:00
END   2020/05/02   00:00

ALLOCATION

PROCESSING     FORWARD (TERM START) ▼
FORWARDING TIME    0  ● DATE ○ HOUR ○ MINUTE
ROUNDING TIME      1  ○ DATE ○ HOUR ● MINUTE
PROCESS LINK       NOT LINK ▼    ☐ LINK BETWEEN MANUFACTURING NUMBER
LINK ARRANGEMENT POSITION    LT POSITION ▼
EXTRUSION          NOT EXTRUDE ▼

☐ CONSIDER ARRANGED MANUFACTURING PLAN
☐ ALLOCATE IN UNIT OF MANUFACTURING ORDER

EXECUTE  CANCEL — 184 185

SAVE — 183

NON-TRANSITORY COMPUTER-READABLE RECORDING MEDIUM HAVING STORED THEREIN DISPLAYING PROGRAM, METHOD FOR DISPLAYING, AND INFORMATION PROCESSING APPARATUS

CROSS-REFERENCE TO RELATED APPLICATION

This application is based upon and claims the benefit of priority of the prior Japanese Patent application No. 2020-077620, filed on Apr. 24, 2020, the entire contents of which are incorporated herein by reference.

FIELD

The embodiment discussed herein relates to a non transitory computer-readable recording medium having stored therein a displaying program, a method for displaying, and an information processing apparatus.

BACKGROUND

In relation to an operation plan exemplified by a production plan of a product, one of the known techniques visualizes operations by displaying a chart in which the operations are arranged on a manufacturing (production) line on the basis of an empty status of the manufacturing line, and the sequence of the operations by a device such as a server. Hereinafter, a "manufacturing line" is sometimes simply referred to as a "line".

For example, when various conditions such as a particular term being regarded as a counting unit of an operation plan, a line to be used, an item to be manufactured, a material to be used, are specified by an operator or the like, the server arranges and displays the operation plan by allocating a use date and time of the line to each operation. Product manufacturing may involve the simultaneous or sequential production of multiple items, as exemplified by the following types.

[Patent Document 1] Japanese Laid-open Patent Publication No. 2006-253184

In manufacturing a product, multiple items may sometimes be produced simultaneously or sequentially as the exemplified by the following types.

Production of products (e.g., paper) same in nature but different in dimension.

Filling of the same liquid into containers different in size.

LR (Left/Right) and LCR (Left/Center/Right) products manufactured by using molds.

Hereinafter, combining multiple items for simultaneous or sequential production is referred to as "assortment". Also, a set of assortable items is referred to as "brands".

SUMMARY

According to an aspect of the embodiments, a non-transitory computer-readable recording medium having stored therein a displaying program for causing a computer to execute a process including: accepting production plans of a plurality of items; determining whether the plurality of accepted items are produced simultaneously or sequentially; when the plurality of items are determined to be produced simultaneously or sequentially, displaying a display component representing a material common to the plurality of items such that the display component indicates a time period containing the production plans of the plurality of items, and displaying display components associated with each of the plurality of items in a time period in which the display component representing the material is arranged.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a non-allocated operation displaying area;

FIG. 6 is a diagram illustrating an example of a production plan list screen;

FIG. 7 is a diagram illustrating an example of a method of adding a brand field to a chart area;

FIG. 11 is a diagram illustrating an example of an operation addition screen;

FIG. 14 is a diagram illustrating an example of a manufacturing plan screen in a brand field;

FIG. 15 is a diagram illustrating an example of an auto-arrangement setting screen;

DESCRIPTION OF EMBODIMENTS

Figure 1:
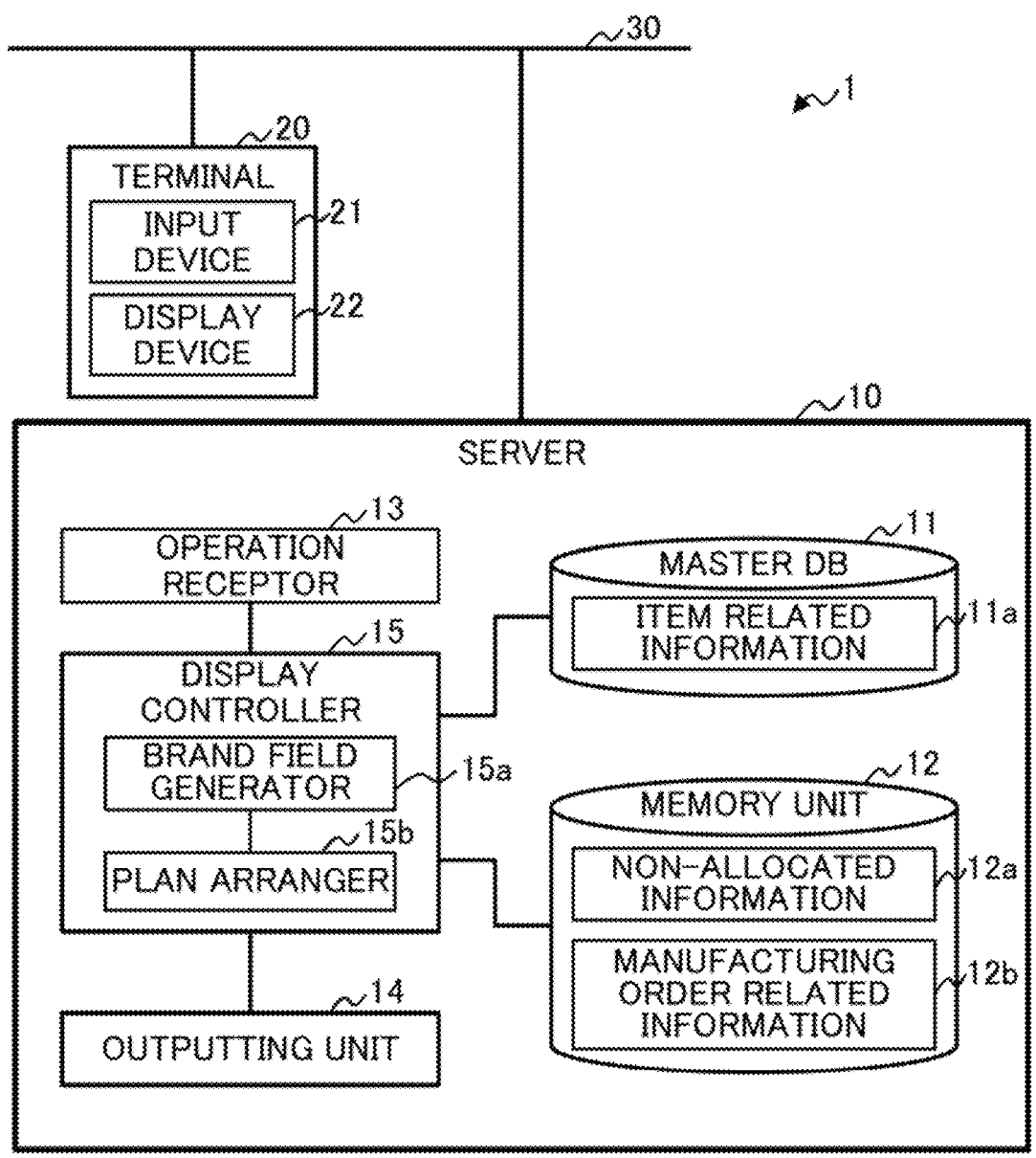
FIG. 1 is a block diagram schematically illustrating an example of the functional configuration of a system according to one embodiment.

The above server does not consider such an assortment of multiple items, and may, for example, manage each of the multiple items and arrange and display an operation plan (production plan) for each item.

However, in cases where the above server manages each of multiple items to be assorted, arranging and displaying of a production plan for each individual item make it impossible to exhibit the relationship among the items, which makes a user difficult to grasp the production plan of a brand.

Hereinafter, an embodiment of the present invention will now be described with reference to the accompanying drawings. However, the embodiment described below is merely illustrative and is not intended to exclude the application of various modifications and techniques not explicitly described below. For example, the present embodiment can be variously modified and implemented without departing from the scope thereof. In the drawings to be used in the following description, the same reference numbers denote the same or similar parts, unless otherwise specified.

[1] One Embodiment

[1-1] Description of System

Figure 2:
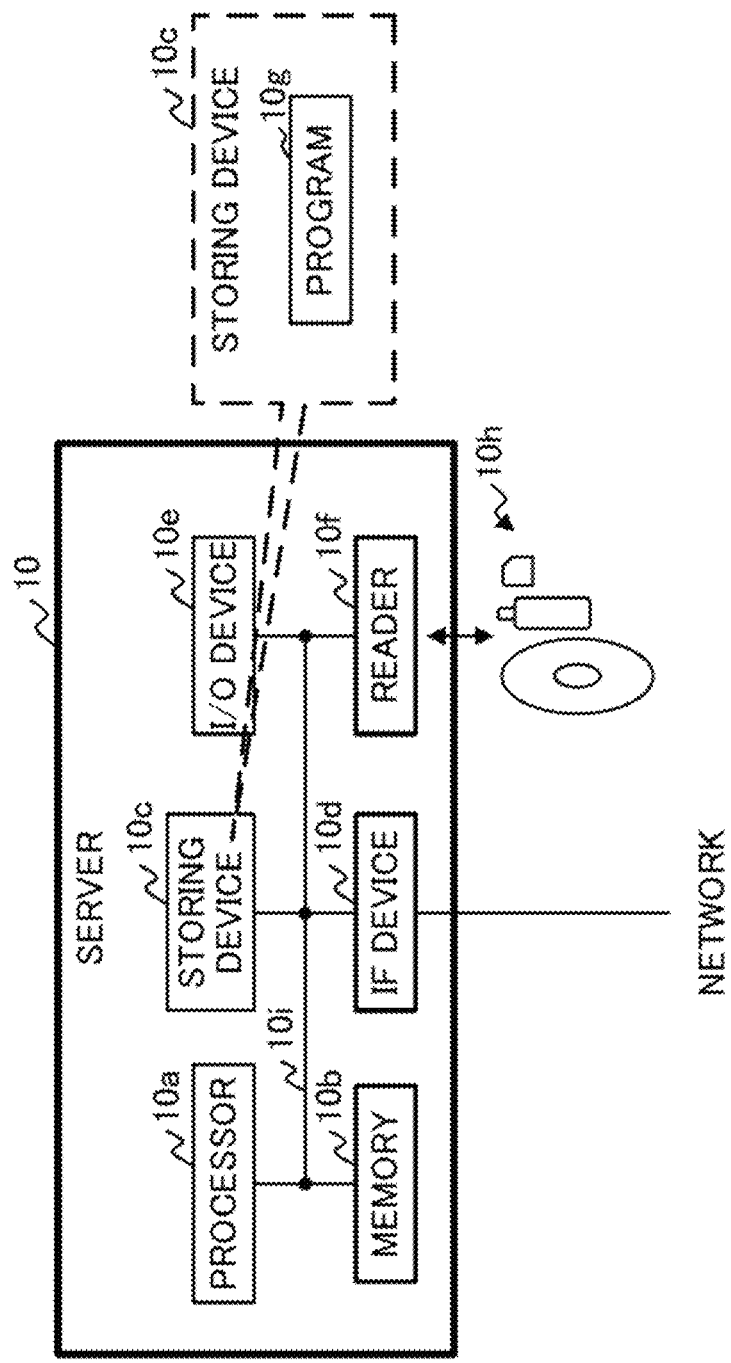
FIG. 2 is a block diagram illustrating an example of the hardware (HW) configuration of a server.

FIG. 1 is a block diagram illustrating an example of the functional configuration of a system 1 according to the one embodiment, and FIG. 2 is a block diagram illustrating an example of the hardware (HW) configuration of a server 10.

As illustrated in FIG. 1, the system 1 may illustratively include the server 10 and a terminal 20. The system 1 may include multiple terminals 20.

The server 10 is an example of an information processing apparatus. The server 10 can cause the terminal 20 to display a screen indicating a production plan by performing a process related to generation of a production plan in response to an access from the terminal 20 and responding to the terminal 20 with the processing result.

The terminal 20 is an example of a terminal device and may be regarded as a client of the server 10. As illustrated in FIG. 1, the terminal 20 may illustratively include an input device 21 and a display device 22. The terminal 20 may access the server 10 through operating an input device 21 by an operator and display a response (processing result) from the server 10 on the display device 22.

The communication between the terminal 20 and the server 10 may be inter-application communication between a client application on the side of the terminal 20 and a server application on the side of the server 10. This communication may include communication between a Web browser on the side of the terminal 20 and a web server on the side of the server 10 via, for example, a Hypertext Transfer Protocol (http).

The server 10 and the terminal 20 may be communicably connected to each other via a network (NW) 30 including one of or both wired and wireless networks. Examples of the network 30 include networks complying with standards such as Ethernet (listed trademark) or InfiniBand (registered trademark).

The server 10 may be a virtual server (Virtual Machine (VM)) or a physical server. The function of the server 10 may be achieved by one computer or by two or more computers. Further, at least some of the functions of the server 10 may be implemented using HW resources and NW resources provided by cloud environment.

Example of Hardware Configuration

Next, description will now be made in relation to an example of the hardware configuration of the server 10. The terminal 20 may have the same hardware configuration as the server 10. Hereinafter, description will now be made in relation to an example of a hardware configuration of the server 10 as a representative of the server 10 and the terminal 20. If multiple computers are used as the HW resources for achieving the functions of the server 10, each of the computers may include the HW configuration illustrated in FIG. 2.

As illustrated in FIG. 2, a server 10 serving as an example of a computer or an information processing apparatus may illustratively include a processor 10a, a memory 10b, a storing device 10c, an IF (Interface) unit 10d, an I/O (Input/Output) unit 10e, and a reader 10f.

The processor 10a is an example of an arithmetic operation processor that performs various controls and calculations. The processor 10a may be communicably connected to the blocks in the server 10 to each other via a bus 10i. The processor 10a may be a multiprocessor including multiple processors, may be a multicore processor having multiple processor cores, or may have a configuration having multiple multicore processors.

Examples of the processor 10a include an integrated circuit (IC) such as a Central Processing Unit (CPU), a Micro Processing Unit (MPU), a Graphics Processing Unit (GPU), an Accelerated Processing Unit (APU), a Digital Signal Processor (DSP), an Application Specific IC (ASIC), and a Field-Programmable Gate Array (PPGA). The processor 10a may be a combination consisting of two or more of these ICs.

The memory 10b is an example of a HW device that stores various types of data and information such as a program. Examples of the memory 10b include one or both of a volatile memory such as DRAM (Dynamic Random Access Memory) and a non-volatile memory such as Persistent Memory (PM).

The storing device 10c is an example of a HW device that stores various types of data and information such as program. Examples of the storing device 10c include a magnetic disk device such as a Hard Disk Drive (HDD), a semiconductor drive device such as a Solid State Drive (SSD), and various storing devices such as a nonvolatile memory. Examples of the non-volatile memory include a flash memory, a Storage Class Memory (SCM), and a Read Only Memory (ROM).

The storing device 10c may store a program 10g (displaying program) that implements all or part of the various functions of the server 10. For example, the processor 10a of the server 10 can achieve the function as the server 10 illustrated in FIG. 1 by expanding program 10g scored in storing device 10c into the memory 10b and executing the expanded program 10g.

The IF device 10d is an example of a communication IF that controls connection and communication with a network. For example, the IF device 10d may include an adapter complying with a Local Area Network (LAN) such as Ethernet or optical communication such as a FC (Fiber Channel). The adapter may be compatible with one of or both wireless and wired communication schemes. For example, the server 10 may be communicably connected to the terminal 20 via the IF device 10d. For example, the program 10g may be downloaded from a network to the server 10 via the communication IF and stored into the storing device 10c.

The I/O device 10e may include one of or both an input device and an output device. Examples of the input device include a keyboard, a mouse, and a touch panel. Examples of the output device include a monitor, a projector, and a printer.

The reader 10f is an example of an reader that reads data and programs recorded in the recording medium 10h. The reader 10f may include a connecting terminal or device to which the recording medium 10h can be connected or inserted. Examples of the reader 10f include an adapter conforming to, for example, Universal Serial Bus (USB), a drive apparatus that accesses a recording disk, and a card reader that accesses a flash memory such as an SD card. The program 10g may be stored in the recording medium 10h, and the reader 10f may read the program 10g from the recording medium 10h and store the read program 10g into the storing device 10c.

The recording medium 10h is example of a non-transitory computer-readable recording medium such as a magnetic/optical disk, and a flash memory. Examples of a magnetic/optical disk include a flexible disk, a Compact Disc (CD), a Digital Versatile Disc (DVD), a Blu-ray disk, and a Holographic Versatile Disc (HVD). Examples of the flash memory include a semiconductor memory such as a USB memory and an SD card.

The above HW configuration of the server 10 is merely illustrative. Accordingly, the server 10 may appropriately undergo increase or decrease of HW devices (e.g., addition or deletion of arbitrary blocks), division, integration in an arbitrary combination, and addition or deletion of the bus. For example, the server 10 may omit at least one of the I/O device 10e and the reader 10f.

The terminal 20, which is an example of the information processing terminal, may be achieved by the same HW configuration as that of the server 10 described above. For example, the processor 10a of the terminal 20 can achieve the function as the terminal 20 illustrated in FIG. 1 by expanding a program 10g stored in storing device 10c into the memory 10b and executing the expanded program 10g.

For example, the input device 21 of the terminal 20 illustrated in FIG. 1 is an example of the input device of the I/O device 10e, and the display device 22 is an example of the output device of the I/O device 10e. As an example, the processor 10a of the terminal 20 may display each screen on the display device 22 on the basis of the information received from the server 10 via the IF device 10d, and may transmit the information input into the input device 21 to the server 10 via IF device 10d.

Server 10 According to the One Embodiment

The server 10 generates an operation plan by allocating the date and time to operation information. Examples of an operation plan includes a manufacturing plan for treating or assembling a product in a factory or the like. In the following description, an operation plan is assumed to be a manufacturing plan in which multiple items are simultaneously or sequentially manufactured by assortment.

Production of products same in nature but different in dimension.
Filling of the same liquid into containers different in size.
LR products and LCR products using molds.

As an example, it is assumed that multiple items having different "widths" and/or "lengths" are produced by slitting a material of "film" or "paper" having the same nature.

For example, the user manages the items to be produced at the same time by the server 10, considering a "division number". A "division number" is the number of items produced simultaneously or sequentially (number of assortments), in other words, the amount of production that can be produced simultaneously. Hereinafter, the division number n (n is an integer equal to or larger than 2) may sometimes be referred to as "division into n".

Figure 3:
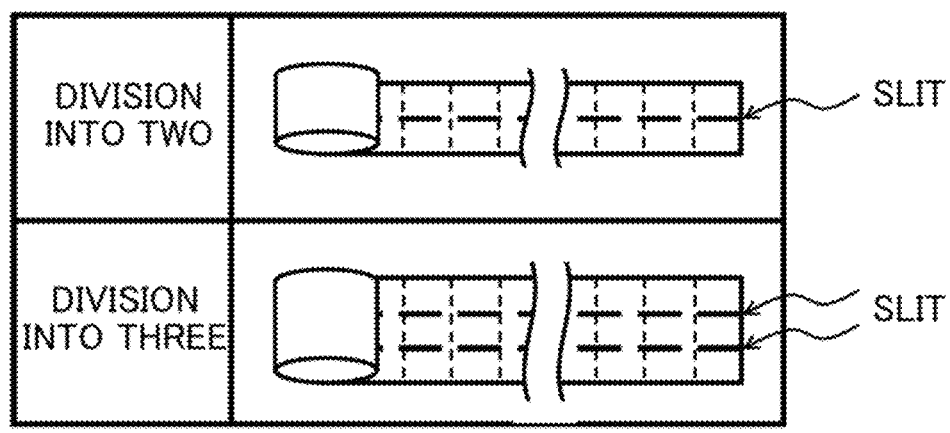
FIG. 3 is a diagram illustrating an assortment.

As illustrated in FIG. 3, in the cases of division into two, two items are simultaneously produced by treatment on a common material of the multiple items with a single slitter. Likewise, in the cases of division into three, three items are simultaneously produced by treatment on a common material of the multiple items with two slitters. In the following description, a case where multiple items are produced by slitting from a roll of film, paper, or the like as a common material will be described as an example.

As described above, typical arranging and displaying of an operation plan have not considered assortment of multiple items. In turn, multiple items are managed individually and the operation plan (production plan) of each individual item is arranged and managed, for example.

As a solution to the above, the server 10 according to the one embodiment displays the display components indicating the material common to multiple items so as to indicate a time period including the production plans of the multiple items, and displays the display components corresponding one to each of the multiple items in accordance with the time period in which the display components indicating the materials are arranged.

Thereby, the display component indicating a material common to multiple items is displayed, for example, in a chart. In addition, the display components corresponding one to each the multiple items are displayed in accordance with the time period in which the display components are arranged. Thus, for example, it is possible to easily grasp production plans for multiple items which are to be produced simultaneously or sequentially.

Example of Functional Configuration

Next, description will now be made in relation to a functional configuration of the server 10.

As illustrated in FIG. 1, the server 10 may include a master Database (DB) 11, a memory unit 12, an operation receptor 13, an outputting unit 14, and a display controller 15.

The master DB 11 is a database that stores and manages various types of master information to be used for generation and displaying a production plan. Focusing on the function of the one embodiment related to generating and displaying a production plan of multiple items simultaneously or sequentially produced, for example, the master DB 11 may store and manage item related information 11a.

The memory unit 12 stores various pieces of information, e.g., transaction information, to be used for generating and displaying a production plan. Focusing on the function of the one embodiment, for example, the memory unit 12 may store non-allocated information 12a and manufacturing order related information 12b.

The master DB 11 and the memory unit 12 may be achieved by at least part of the storage areas of the memory 10b or the storing device 10c of the server 10 illustrated in FIG. 2. Details of the pieces of information stored by the master DB 11 and the memory unit 12 will be described below in the description of an example of display control by the display controller 15. In the following description, information 11a, 12a, and 12b that the master DB 11 and the memory unit 12 store are illustrated in table forms, but the forms of the information are not limited to this. Alternatively, the information 11a, 12a, and 12b may be stored in the master DB 11 and the memory unit 12 in various formats, such as a DB or an eXtensible Markup Language (XML).

The operation receptor 13 accepts an access request from the terminal 20 and outputs an instruction responsive to the access request to the display controller 15. An example of the access request is an operation request for an operation to be made on the screen related to the manufacturing plan displayed on the display device 22. Focusing on the functions of the one embodiment, the operation receptor 13 is an example of an accepting unit that accepts production plans for multiple items.

The outputting unit 14 transmits a processing result from the display controller 15 to the terminal 20. An example of the processing result includes screen information responsive to an operation request for an operation made on a screen related to a manufacturing plan. Examples of the screen information include various types of information such as charts, graphs, and text, information related to screen control such as windows and tooltips, various parameters, and control information.

The processing result may include the result of the generation and displaying of an operation plan by the display controller 15, that is, the result of the arrangement the plan on a chart. The information may be output to the terminal 20 or another system, and may be referred to at the output destination in the management or execution of the operation.

In response to an instruction from the operation receptor 13, the display controller 15 controls displaying of a screen to be displayed on the display device 22 and outputs the processing result to the outputting unit 14. The displaying control may include generating and updating of information such as a chart, a graph, and text to be displayed on a screen, screen transition, screen control, and scale control, for example.

The display controller 15 may exemplarily include a brand field generator 15*a* and a plan arranger 15*b*.

The brand field generator 15*a* generates a brand field on a chart on the basis of one of or both the list of non-allocated operations and the list of manufacturing plans, and sets (allocates) a non-allocated operation to the generated brand field. The list of non-allocated operations is a list of operations for which the equipment used for manufacturing a corresponding item is not determined. The list of the manufacturing plans is a list of non-allocated operations and allocated operations for which the equipment used for manufacturing a corresponding item is determined.

The plan arranger 15*b* arranges a brand field onto the facility, considering various constraints in a unit of a brand field, and displays a brand field including the operation of each item on the chart in association with the arranged facility.

For example, the brand field generator 15*a* may be positioned as a functional unit that performs arrangement of a brand field and allocation of an operation in response to an operation of an operator, and the plan arranger 15*b* may be positioned as a functional unit that automatically performs arrangement of a brand field and allocation of an operation according to a condition specified by the operator.

[1-2] Example of Displaying Control by Display Controller

Next, an example of displaying control by the display controller 15 will now be described with reference to an example of displaying a screen on the display device 22 of the terminal 20.

Figure 4:
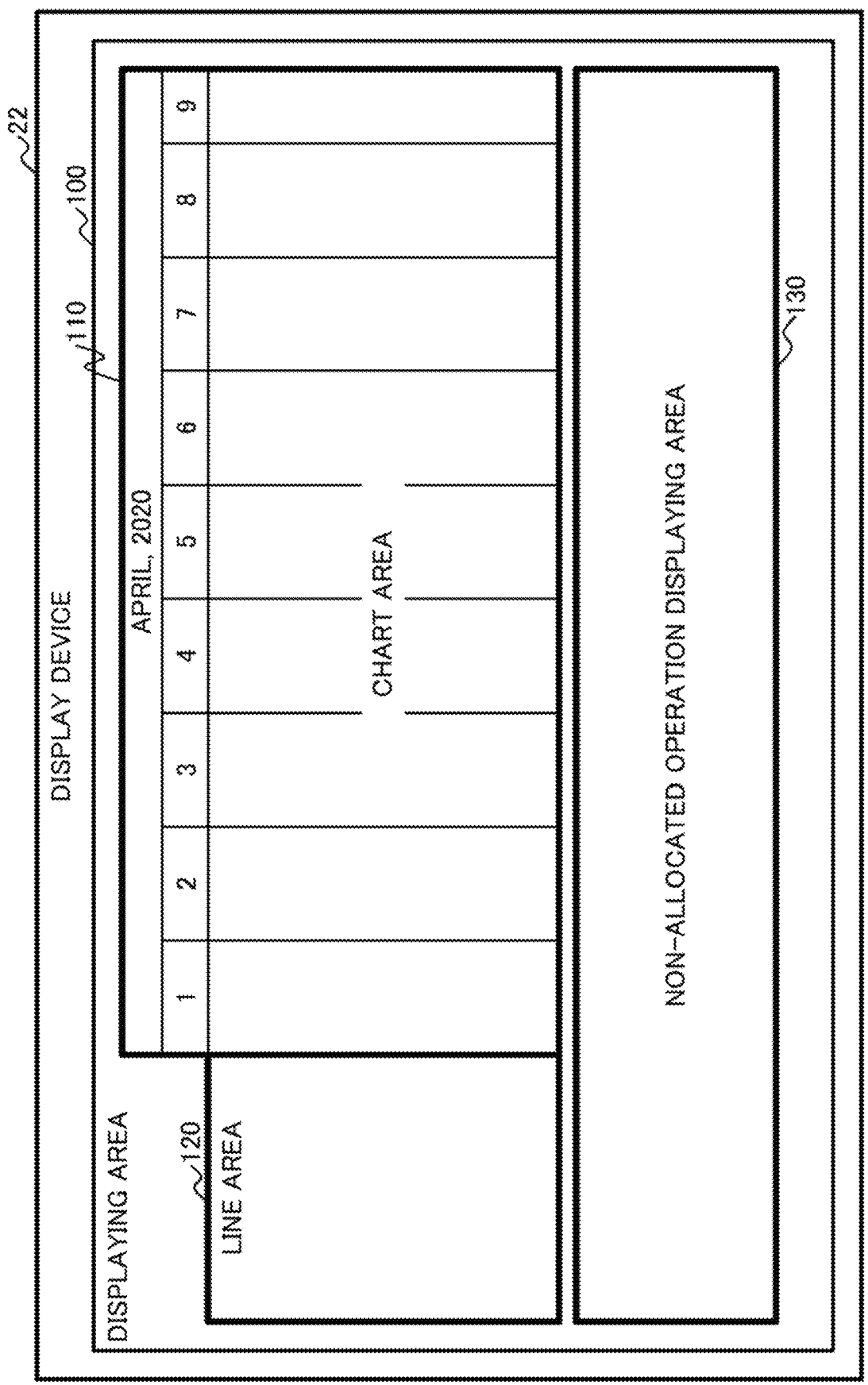
FIG. 4 is a diagram illustrating an example of displaying on a screen of a displaying device.

As illustrated in FIG. 4, the screen of the display device 22 may display a chart area 110, a line area 120, and an non-allocated operation displaying area 130 in a displaying area 100 exemplified by a window of an application that generates an operation plan or a browse.

In the line area 120, elements such as processes and lines are displayed, for example. In the chart area 110, one or multiple types of charts (multi-charts) can be displayed for the elements of the line area 120. In the non-allocated operation displaying area 130, information about a non-allocated operation is displayed.

For example, as illustrated in FIG. 5, the non-allocated operation displaying area 130 may include a searching area 131 for searching for non-allocated operation on the basis of searching conditions from non-allocated information 12*a*, and a display area 132 for displaying a list of non-allocated operation as the searching results of the search area 131.

The non-allocated information 12*a* may include, as information about a non-allocated operation, various types of information such as information on an item, information on a production due date, and information on production amounts, in addition to the "manufacturing order number", "manufacturing order sequence", "manufacturing order sub-sequence", "item codes", and "process pattern" illustrated in FIG. 5.

For example, the manufacturing plan list screen 140 illustrated in FIG. 6 may be displayed in the display area 100. As illustrated in FIG. 6, the manufacturing plan list screen 140 may include a searching area 141 for searching for a manufacturing plan from a manufacturing order related information 12*b* on the basis of a searching condition, and a displaying area 142 for displaying a list of the manufacturing plans as a searching result, of the searching area 141.

The manufacturing order related information 12*b* is information for managing a manufacturing plan of a product or a component and is, for example, transaction data updated on the basis of an instruction (manufacturing order) of producing the product or the component from an operator or another system. The manufacturing order may include a brand order. The manufacturing order related information 12*b* may include, as information about an allocated operation or a non-allocated operation, various type of information described below in addition "allocation state", "manufacturing order number", "manufacturing order sequence", "manufacturing order sub-sequence", "process pattern", and "item code" illustrated in FIG. 6.

For example, the operator confirms the manufacturing operation with reference to the non-allocated operation displaying area 130 or the manufacturing plan list screen 140, and arranges a non-allocated operation in the chart area 110 on the basis of the manufacturing order. The brand field generator 15*a* allocates the items of the manufacturing operation to the chart area 110 or, the basis of item related information 11*a* in response to an operation from the operator.

Generation of Brand Field

Here, in the one embodiment, the operator may arrange a brand field in the chart area 110 in consideration of the brand specified in a brand order as the manufacturing order. A brand field is an example of a display component indicating a material common to multiple items produced simultaneously or sequentially.

FIG. 7 is a diagram illustrating an example of a method of adding a brand field to the chart area 110. As indicated by the symbol A in FIG. 7, the operator right-clicks at a position where the operator wishes to generate a brand field (i.e., the date and time and a line resource on the chart) on the chart area 110, and thereby displays a menu 111. When an "add brand field" is selected in the menu 111 displayed on the chart area 110 by the operation of the operator, the brand field generator 15a displays a brand field addition confirmation screen 150 (see the symbol B) on the display area 100.

The brand field addition confirmation screen 150 may include a setting area 151 related to a brand field, an operation addition button 152 for generating or allocating an operation simultaneously with the addition of a brand field, an execute button 153, and a cancel button 154 for closing the brand field addition confirmation screen 150.

In the setting area 151, the "brand" is an area for selecting a brand to be generated, for example, a name of a stuff such as a film, or paper. The "order amount" is an area for making it possible to earmark the necessary amount of material when the item composition is set for a brand. The input into "order amount" may be omitted. The "time length calculation segment" is an area for selecting the type of the operation time length of the brand field. The "division number" is an area for inputting the division number of assortment. The "division number" may be filled in cases where "(total sum)/(division number)" is selected in the "time length calculation segment". The "minimum time length" is an area for inputting a time length (for example, in units of "minutes") of a brand field in a state where an operation is not allocated.

Here, the types of the "time length calculation segment", that is, the types of the time length of the brand field may be selected from the following types (a) to (d), depending on the manufacturing method.

(a) Calculate from a Brand Field (calculation based on the quantity and the capability of brand order)

The brand field generator 15a calculates the operation time length based on the item related information 11a from the quantity and the capability set for the brand order like a normal manufacturing plan. The capability may be, for example, the production capability of a brand in accordance with constraints such as the manufacture capability (speed) of the brand in the line and the occupied resources, and may be, for example, the manufacturing amount (amount/minute) per minute or the production time (minute/amount) per brand.

Figure 8:
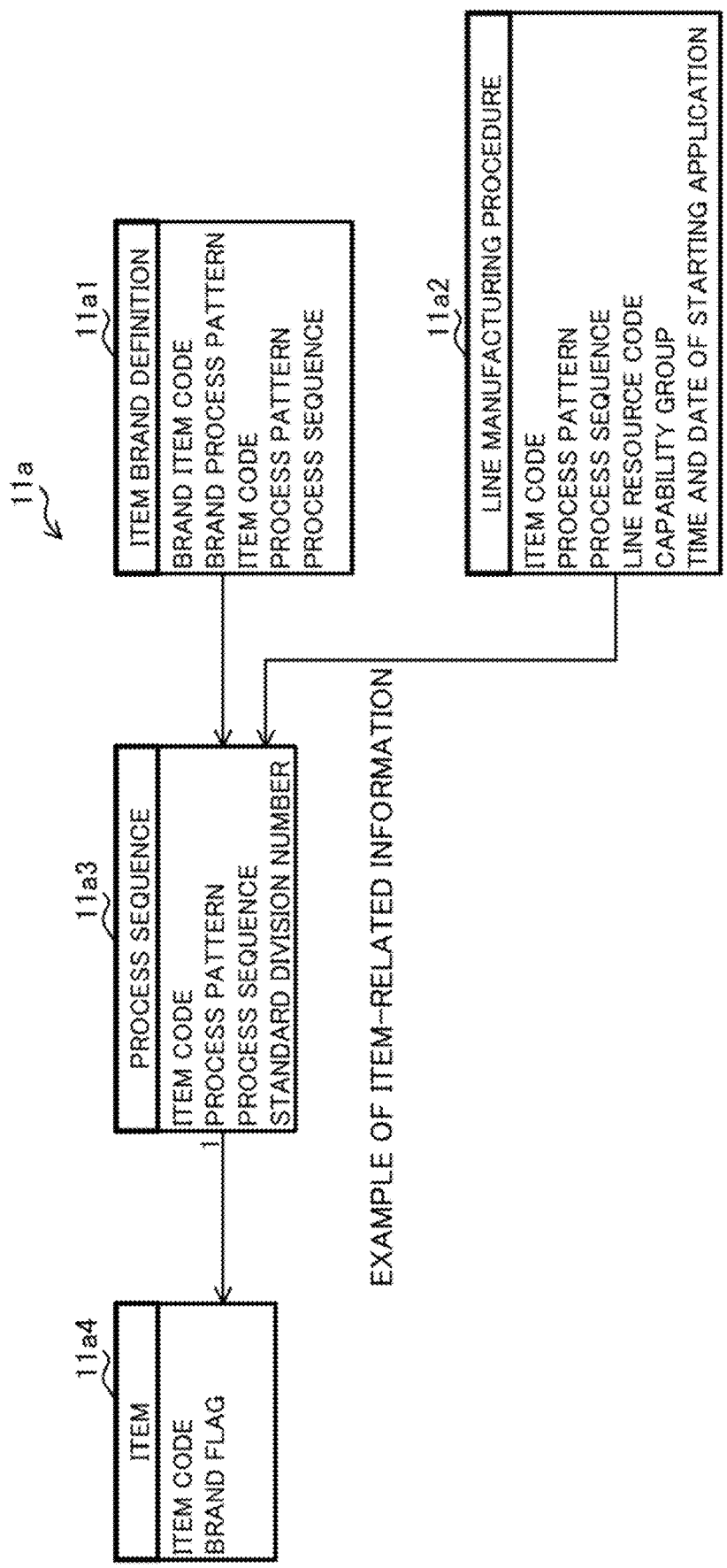
FIG. 8 is a diagram illustrating an example of item related information.

FIG. 8 is a diagram illustrating an example of the item related information 11a. As illustrated in FIG. 8, the item related information 11a may illustratively include at least an item brand definition master 11a1, a line manufacturing procedure master 11a2, a process sequence master 11a3, and an item master 11a4.

The item brand definition master Ha1 stores information defining the relationship between a brand and an item, such as "brand item code", "brand process pattern", "item code", "process pattern", and "process sequence".

The line manufacturing procedure master 11a2 stores information that defines the relationship between a process sequence of an item and a line resource and the process sequence of an item such as "item code", "process pattern", "process sequence", "line resource code", "capability group", and "date and time of starting application". The brand field generator 15a can narrow the target equipment that can generate the brand field from the line manufacturing procedure master 11a2.

The process sequence master 11a3 is information defining a manufacturing process of an item, such as "item code", "process pattern", "process sequence", and "standard division number". The brand field generator 15a can narrow the processes for which a brand field can be generated from the process sequence master 11a3.

The item master 11a4 stores information of an item such as "item code" and "brand flag". The "brand flag" set to "0" represents a normal item, and that set to "1" represents a brand item, i.e., a brand field, for example.

In this manner, in the item-related information 11a, a brand are also managed on the item master 11a4 in order to generate a manufacturing order and a manufacturing plan of the brand. The brand item is set in the process sequence master 11a3. Further, in case where multiple out-of-order process sequence masters 11a3 are registered for items of a brand, only the final process is used.

For example, the brand field generator 15a may extract the quantity and the capability of a brand order associated with the item code having a brand flag set to "1" in the item master 11a4 from the process sequence master 11a3 and the line manufacturing procedure master 11a2, and calculate the operation time length based on the extracted information.

The above-mentioned method (a) may be adopted, for example, in the case of performing appointment of a time field (fixed operation time length) according to the brand order, or in the case of allocating the brand order before allocating the manufacturing order.

(b) Maximum Value (Manufacturing Plan Unit)

The brand field generator 15a calculates the time length for each manufacturing plan in the brand order and adopts the maximum value among the calculated time lengths. In other words, the brand field generator 15a sets, in the time length of the brand field, the manufacturing time of the manufacturing order having the longest manufacturing time (production time) among the multiple operations allocated to brand field.

(c) Maximum Value (Item Unit)

The brand field generator 15a calculates the time length for each manufacturing plan in the brand order, collects the time lengths for each item and calculates the total value of the time length of each item, and adopts the maximum value among these total values. In other words, the brand field generator 15a sets, in the time length of the brand field, the manufacturing time of the item having the longest manufacturing time (production time) among the multiple items allocated to brand field.

The above-mentioned methods (b) and (c) may be employed, for example, in generation of a manufacturing plan for an LR product or an LCR product.

(d) Total Value/Division Number

The brand field generator 15a calculates the time length for each manufacturing plan in the brand order and divides the total value of the calculated time lengths by the division number. In other words, the brand field generator 15a calculates the total value of the manufacturing times (production times) of the respective manufacturing orders of multiple operations allocated to the brand field and adopts a value obtained by dividing the calculated total value by the division number. The brand field generator 15a may set the length of the brand field 112 to a value obtained by calculating the time length of each manufacturing plan in a brand order, collecting the time lengths for each item and calculating the total value of the time lengths for the item, and dividing the total value of the total values by the division number.

As the above, the brand field generator 15a may determine the length of the brand field 112 on the basis of the production time of each of multiple, items on the basis of the total value of the respective production times of the production plans of multiple items and on the basis of the number of assortments of multiple items from the brand. The above-mentioned method (d) may be employed, for example, in the manufacturing having a division number n or generation of a plan of continuous production (i.e., division number=1).

Upon selecting and inputting the information of the brand field to the setting area 151, the operator clicks the execution button 153 to display the brand field 112 on the chart area 110 (see the symbol C in FIG. 7). When the operator clicks the execute button 153, the brand field generator 15a displays a brand field 112 on the chart area 110 according to the information set in the setting area 151.

When the above-mentioned methods (b) to (d) are selected as the "time length calculation segment" and no operation is allocated to brand field (when only brand field is arranged in the chart area 110), the time length of the brand field may be set on the basis of the above-mentioned method (a).

The brand field generator 15a updates manufacturing order related information 12b based on the information set in the setting area 151 when the execution button 153 is clicked.

Figure 9:
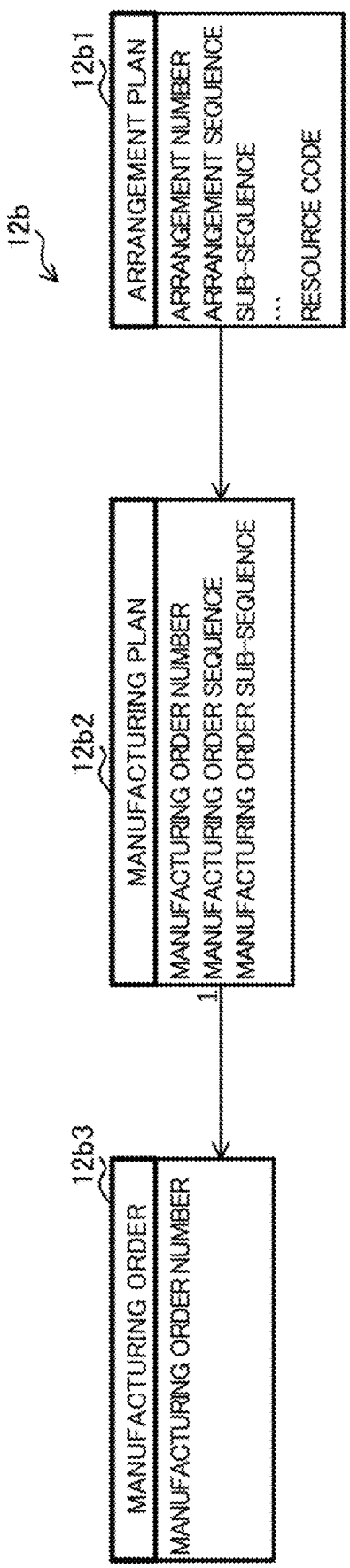
FIG. 9 is a diagram illustrating an example of manufacturing order related information.

FIG. 9 is a diagram illustrating an example of the manufacturing order related information 12b. As illustrated in FIG. 9, the manufacturing order related information 12b may illustratively include at least an arrangement plan 12b1, a manufacturing plan 12b2, and a manufacturing order 12b3.

The arrangement plan 12b1 stores arrangement information related to the arrangement, such as an "arrangement number" representing a manufacturing order, an "arrangement sequence" indicating a process sequence, a "sub-sequence" used when multiple pieces of arrangement information is provided, and a "resource code" representing a line resource code or an occupied resource code.

The manufacturing plan 12b2 is information for managing the manufacturing information of an item for each process, such as "manufacturing order number", "manufacturing order sequence" in which the process sequence is set, and "manufacturing order sub-sequence" used when the process sequence is divided.

The manufacturing order 12b3 stores manufacturing information related to manufacturing of an item and including at least "manufacturing order number".

For example, brand field generator 15a may generate at least the manufacturing plan 12b2 including the brand flag="1" and the respective pieces of information set in the setting area 151.

As described above, the manufacturing plan of the brand can be allocated to the line resource like a normal manufacturing plan. The brand field generator 15a may set the allocated facility information to the arrangement plan 12b1 of the manufacturing order related information 12b. Unlike a normal manufacturing plan, the manufacturing plan of the brand may be prohibited from allocating a production field.

Arrangement of Operations to Brand Field

Figure 10:
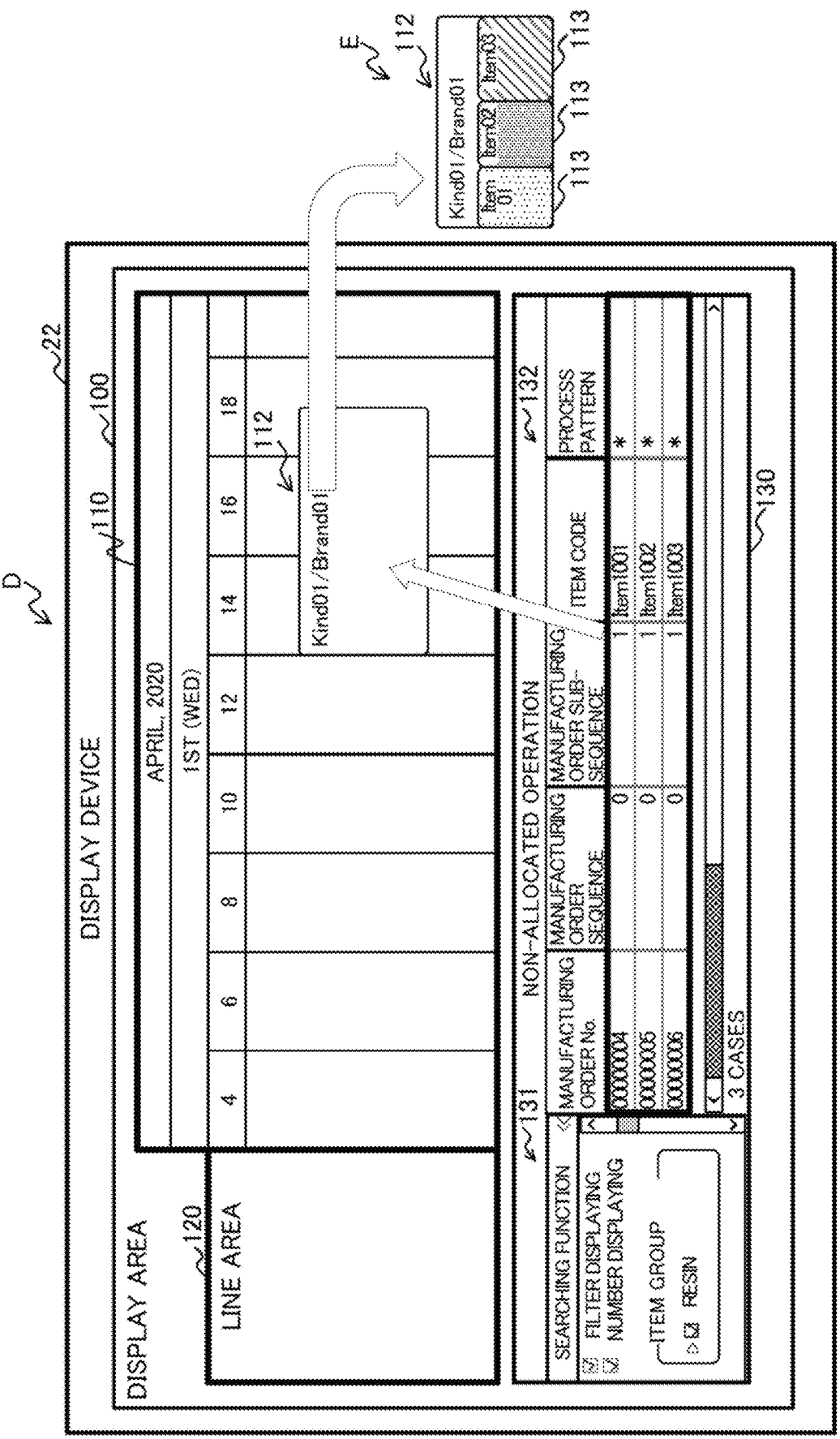
FIG. 10 is a diagram for explaining an example of a method of arranging operation onto a brand field.

As exemplified by the symbol D in FIG. 10, the operator selects one or more non-allocated operations (two or more non-allocated operations in case of an assortment) displayed in the non-allocated operation displaying area 130, and allocates the operations 113 (refer to the symbol E) to the brand field 112 by moving the selected non-allocated operations to the brand field 112. The operations 113 are examples of display components associated one with each of multiple items, and indicate time periods of the production plan of the multiple items on the chart area 110.

An operation may be moved to the brand field 112, for example, by dragging and dropping, or by designating on the non-allocated operation displaying area 130.

The brand field generator 15a may obtain information of items that can be allocated in brand field 112 with reference to item-related information 11a. For example, the brand field generator 15a can specify, from the item master 11a4, a normal item having a brand flag="0", that is, an allocatable item in the brand field 112.

Further, the brand field generator 15a may narrow one or more processes each to which the operation can be allocated from the process sequence master 11a3, narrow the facilities each to which the operation can be allocated from the line manufacturing procedure master 11a2, and narrow the items each to which the operation can be allocated in the brand field 112 from the item brand definition master 11a1.

Figure 11:
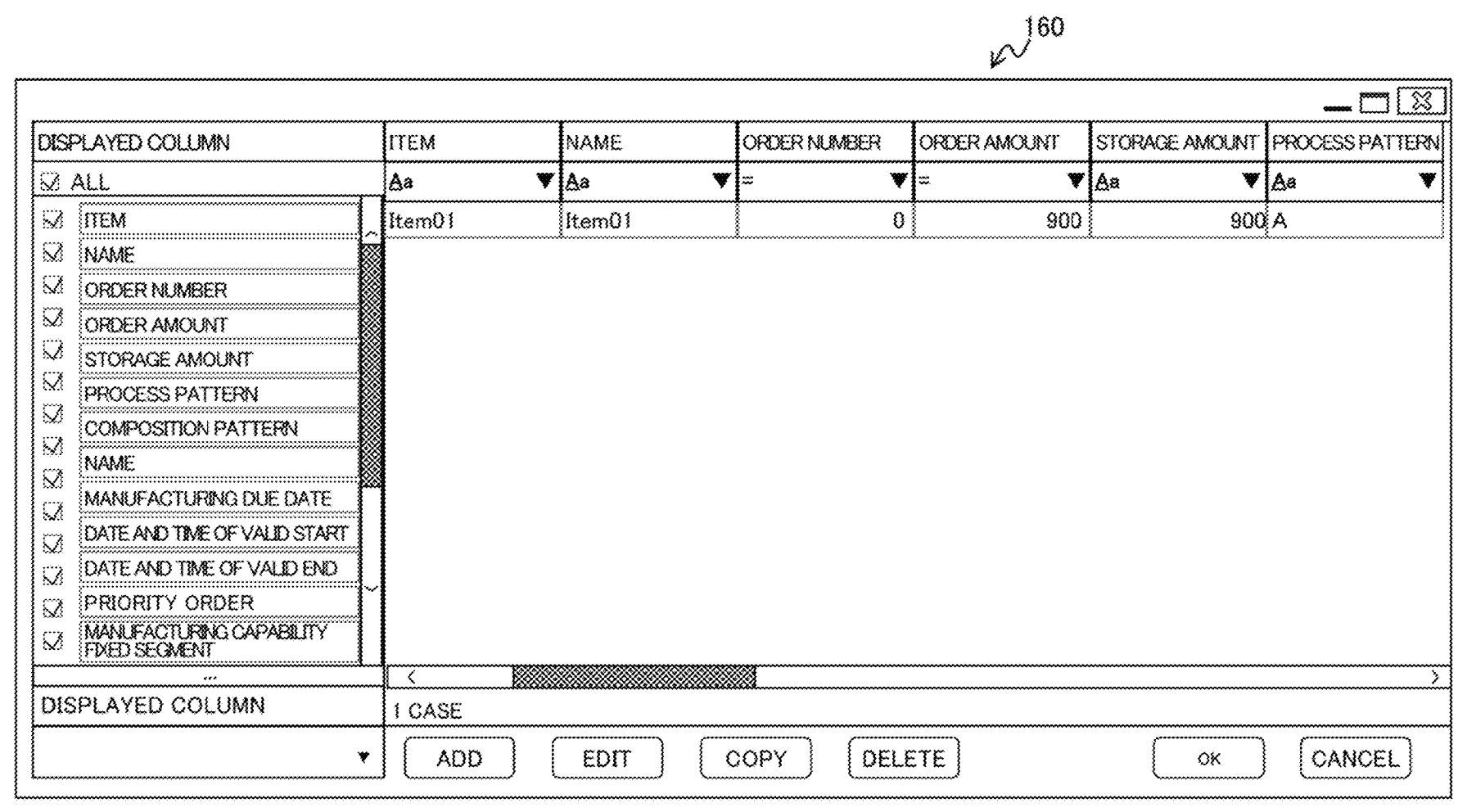

The operator may click the operation addition button 152 on the brand field addition confirming screen 150 to display the operation addition screen 160 illustrated in FIG. 11 in the display area 100. For example, the operator may select the operation 113 that is to be allocated to a brand field 112 to be added simultaneously with the addition of the brand field 112 through operating the operation addition window 160.

The brand field generator 15a may add the operation 113 selected on the operation addition screen 160 into the brand field 112 selected and input on the brand field addition confirmation screen 150 to display the brand field 112 and the operation 113 in the chart area 110 (see the symbol E in FIG. 10).

As described above, the brand field generator 15a can determine whether or not the selected multiple items (operations) are items allocatable to the brand field by referring to the item-related information 12a. In other words, the brand field generator 15a is an example of a determination unit that determines whether multiple items accepted by the operation receptor 13 are items simultaneously or sequentially produced.

The Brand Field and Operation in Brand Field

Figure 12:
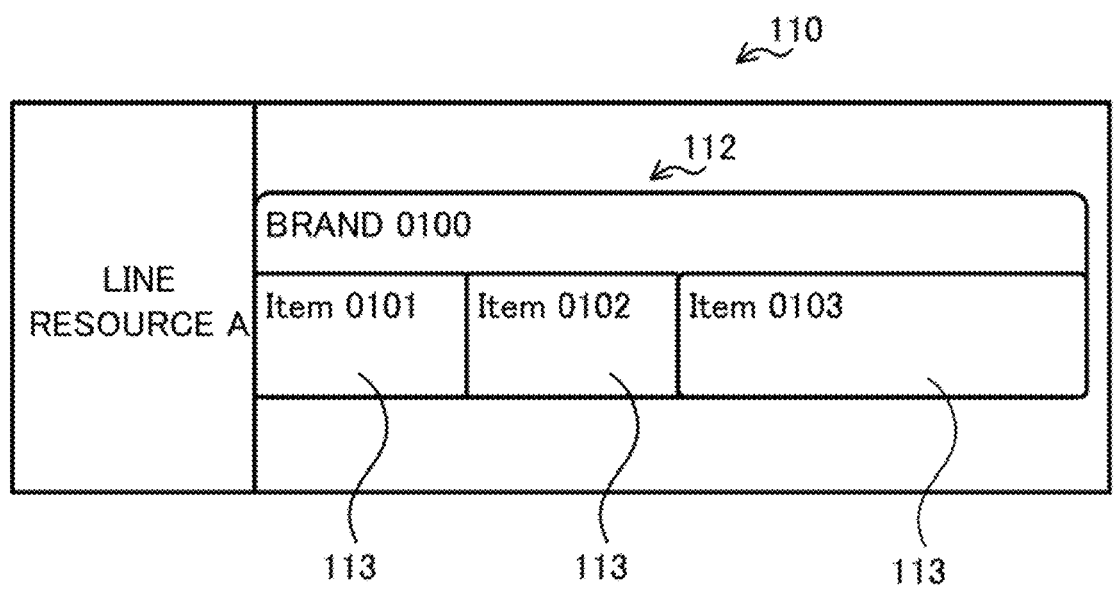
FIG. 12 is a diagram illustrating a brand field arranged in a line resource and multiple operations allocated in a brand field.

FIG. 12 is a diagram illustrating a brand field 112 arranged in a line resource A in the chart area 110 and multiple operations 113 allocated to the brand field 112.

As illustrated in FIG. 12, the brand field generator 15a is an example of displaying unit that displays, if determining that the multiple items are simultaneously or sequentially produced, the brand field 112 and the operations 113 corresponding one to each of the multiple items.

For example, the brand field generator 15a may set the time length of the brand field 112, i.e., the display width (length) of the brand field 112 on the chart area 110, in accordance with the segment (see the above-mentioned methods (a) to (d)) selected in the "time length calculation segment" of the setting area 151. For instance, if the "time length calculation segment" is the above segments (b) to (d), the brand field generator 15a may adjust the time length of the brand field 112 based on the time length of the operation assigned to brand field 112.

As described above, if determining that the multiple items are items produced simultaneously or sequentially, the brand field generator 15a serving as one example of a displaying unit displays the brand field 112 indicating a material common to the multiple items so as to indicate a time period including the production plans (operations 113) of the multiple items.

Further, the brand field generator 15a serving as an example of the displaying unit displays display component (operations 113) corresponding one to each of the multiple items in accordance with a time period in which the brand field 112 is arranged. For example, the brand field generator 15a may set the respective time lengths of the operations 113 in the brand field 112, i.e., the display width (length) of each operation 113 on the chart area 110, to be proportionally divided by all the operations 113 in the brand field 112.

For example, as illustrated in FIG. 12, the brand field generator 15a may calculate the time length of each operation 113 in the brand field 112 on the basis of the division number of each operation 113. In the example illustrated in FIG. 12, "item 0101" and "item 0102" both have a division number of "1", and the "item 0103" has a division number of "2". In this case, the continuous ratio of the time length of the "item 0101", "item 0102", and "item 0103" in the brand field 112 is 1:1:2.

Figure 13:
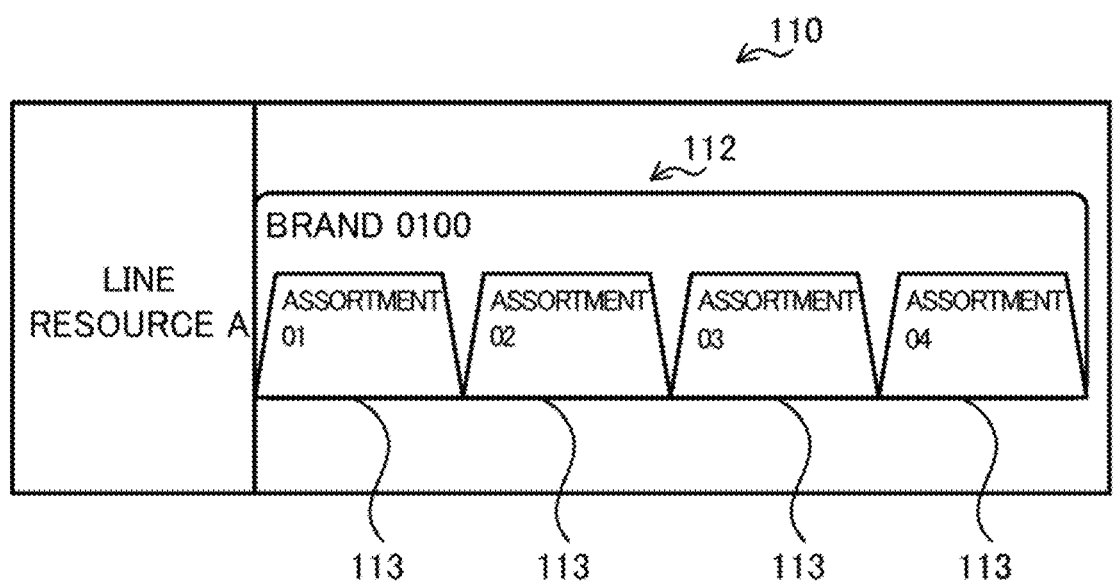
FIG. 13 is a diagram illustrating an example of displaying a brand field and operations based on an assortment considering dimensions.

The brand field generator 15a may also calculate the time length of each operation 113 in the brand field 112 on the basis of, for example, the dimension, and the content of the item manufactured in each operation 113. FIG. 13 is a diagram illustrating an example of displaying of the brand field 112 and the operations 113 based on the assortment considering the dimensions. As illustrated in FIGS. 12 and 13, multiple modes may be prepared for drawing the brand field 112 and the operations 113 onto the chart area 110.

As described above, the multiple operations 113 allocated to the brand field 112 are those in which items of the operations 113 are produced simultaneously or sequentially. For example, assuming that the operation is a slitting process in manufacturing roll paper, multiple items (rolls) are produced simultaneously (in parallel) by a slitting process, and are also produced continuously by cutting the rolls for each roll length (length of one roll).

Determining the display widths of the multiple operations 113 allocated to the brand field 112 in accordance with the information (e.g., the division number, the dimension, and a contents) on the production amount of the items produced in the respective operations 113 makes it possible to easily grasp the production plan.

The brand field 112 is migratable within the chart area 110. For example, even after the brand field 112 and the operation 113 are arranged in the chart area 110, the operator may migrate, by dragging and dropping for example, the brand field 112 along with one or more operations 113 in the brand field 112 to another line resource or the date and time. The brand field generator 15a may update the manufacturing order related information 12b in response to the migration of the brand field 112.

The brand field 112 can be deleted from the chart area 110. For example, the operator may delete the brand field 112 after the brand field 112 and the operations 113 are arranged in the chart area 110. The brand field generator 15a may update the manufacturing order related information 12b in response to the deletion of the brand field 112. The operations 113 in the deleted brand field 112 may be selected from the candidates of being made into a non-allocated state or being deleted.

In addition, the allocation of the brand field 112 can be canceled. For example, the operator may cancel the allocation of the brand field 112 after the brand field 112 and the operations 113 are arranged in the chart area 110. The brand field generator 15a may update the manufacturing order related information 12b in response to cancellation the allocation of the brand field 112. The manufacturing plan (e.g., a state of allocation to a line resource) for operations 113 in the deallocated brand field 112 may be maintained.

Furthermore, a list of the operations 113 allocated in the brand field 112 can be displayed. For example, the operator may display a list of the operations 113 in the brand field 112 after the brand field 112 and the operations 113 are arranged in chart area 110. The brand field generator 15a may display a list of operations allocated within the specified brand field 112 with reference to the manufacturing order related information 12b in response to a request for displaying the list.

FIG. 14 is a diagram illustrating an example of a manufacturing plan screen 170 in a brand field. As illustrated in FIG. 14, the brand field generator 15a may display, on display area 100, a manufacturing plan screen 170 in a brand field which screen is to display a list of the operations allocated to the specified brand field 112 in response to a request from an operator.

As illustrated in FIG. 14, the manufacturing plan screen 170 in the brand field may include a searching area 171 for narrowing the operations 113 in the brand field 112 and a displaying area 172 for displaying a list of the operations 113 narrowed in the searching area 171. For example, upon receipt of an instruction for migration, deletion, deallocation (cancellation of the allocation) or the like of an operation 113 displayed on the displaying area 172 from the operator, the brand field generator 15a may perform processing corresponding to the instruction for the specified operation 113 or the manufacturing order related information 12b.

Automatic Planning of Brand Field

The above-described brand field 112 and the operations 113 may be arranged in the chart area 110 by the plan arranger 15b in response to registration of a condition by an operator.

The plan arranger 15b displays the auto-arrangement setting screen 180 on the display area 100, and instructs the brand field generator 15a to arrange the brand field 112 and the operations 113 in accordance with the condition set in the auto-arrangement setting screen 180.

FIG. 15 is a diagram illustrating an example of the auto-arrangement setting screen 180. As illustrated in FIG. 15, the auto-arrangement setting screen 180 may include a tab 181, a setting area 182, a save button 183 for saving the setting state of the setting area 182, an execute button 184, and a cancel button 185 for closing the auto-arrangement setting screen 180.

The tab 181 is a button for switching segments such as basic setting, item, item group, line resource, manufacturing plan, production field plan, processing sequence, and constraint. The setting area 182 is an area for setting indicated by the selected tab 181. For example, in the tab 181 of the basic setting, the setting area 182 may display regions for specifying a period of the auto-arrangement and various conditions.

When the operator clicks the execute button 184, the plan arranger 15b may notify the brand field generator 15a of the information selected and input in the setting area 182 to instruct the brand field generator 15a to arrange the brand field 112 and the operations 113 in the chart area 110.

Figure 16:
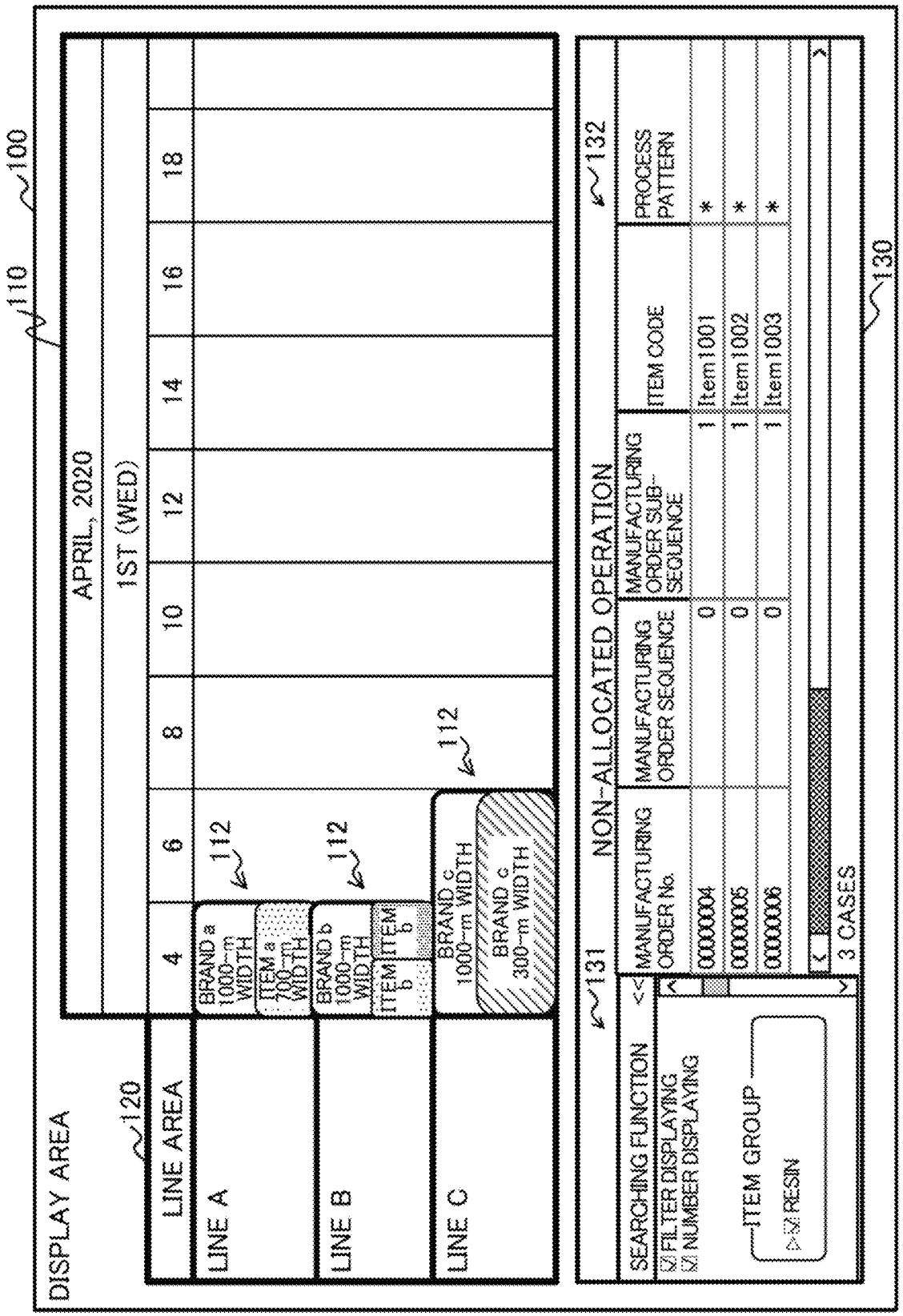
FIG. 16 is a diagram illustrating an example of auto-arranging a brand field for each line resource.

In response to an instruction from the plan arranger 15b, the brand field generator 15a arranges brand field 112 and the operations 113 in the facility in units of brand field on the basis of the notified information and various constraints. For example, the brand field generator 15a may arrange each brand field 112 for each line resource, as illustrated in FIG. 16.

The processing performed by the brand field generator 15a made in response to the instruction from the plan arranger 15b is the same as the method described by referring to FIGS. 7 to 14 except that the specification of the brand field 112 and the operations 113 and the like is notified from plan arranger 15b rather than the operation by the operator.

Handling Transaction Data

The brand field generator 15a may manage the transaction data stored in the memory unit 12 in the following manner in accordance with the arranged brand field 112 and the operations 113 allocated to the arranged brand field 112. The transaction data includes the manufacturing order related information 12b described above.

For example, in cases where the proportionally-dividing earmarking (e.g., in a unit of a "minute") of the inventory control information is set for a brand item, the brand field generator 15a may generate the allocation manufacturing plan 12b2 for proportional dividing. In this instance, the brand field generator 15a may proportionally divide the manufacturing plan 12b2 based on the arrangement plan 12b1 of the brand order.

For example, the production plan 12b2 may be set at the start of the brand field 112 arranged in the chart area 110, such that the materials to be used in all the operations 113 in the brand field 112 are consumed. In this case, it may be managed such that the items to be produced by all the operations 113 in the brand field 112 are completed.

On the other hand, the manufacturing plan 12b2 for proportional dividing may be managed such that, for example, consumption of materials and completion of an item may be accomplished in a unit of a predetermined time period (e.g., one hour).

The brand field generator 15a may manage transaction data of a "dependent demand" that manages the materials consumed in the manufacturing of the brand. The "dependent demand" may be proportionally-divided earmarking on the basis of the manufacturing plan 12b2 for proportionally dividing the brand order and the manufacturing order. The date and time within the "dependent demand" may be based on the arrangement plan 12b1 of the brand order.

The brand field generator 15a may manage transaction data of an "occupied resource arranging plan" that manages a resource to be reused in manufacturing a brand, i.e., resources having restrictions on, for example, personnel, the number of nozzles and winders to be allocated in the manufacturing of a brand. The date and time in the "occupied resource arranging plan" may be based on the arranging plan 12b1 of the brand order.

The brand field generator 15a may manage transaction data of a "switching plan" of operations related to a time (preparation time) for preparation for an operation. The multiple operations 113 included in the brand field 112 may be assumed not to switch an operation such as nozzle switching or core switching. Accordingly, the preparation time in the "switching plan" may be set in a unit of the brand field 112.

Figure 17:
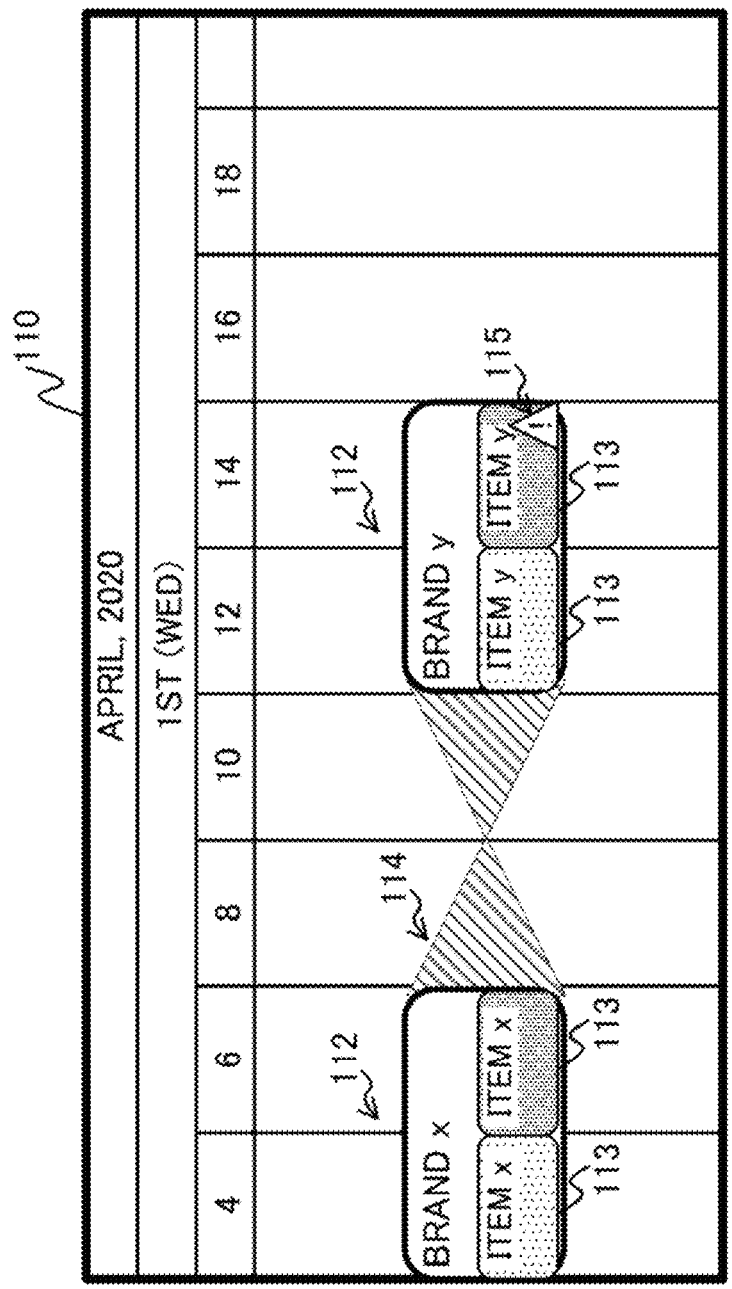
FIG. 17 is a diagram illustrating an example of displaying a brand field in a chart area.

FIG. 17 is a diagram illustrating an example of displaying the brand field 112 in the chart area 110. As illustrated in FIG. 17, a preparation field 114 indicating a preparation time may be displayed in the preparation time between brand fields 112. The preparation field 114 may be similarly displayed not only between the brand fields 112 but also between the brand field 112 and the operation of the manufacturing order having the brand flag="0" and between the brand field 112 and the operations of the manufacturing order having the brand flag="0".

As illustrated in FIG. 17, the brand field generator 15a may di slay an alert 115 considering various constraints in either the arrangement of a brand field 112 by an operation of the operator or the arrangement of the brand field 112 in response to an instruction from the plan arranger 15b.

The alert 115 may be displayed, for example, when the inventory of components such as raw material and material is exhausted in the "dependent demand" or when the upper limit of resources such as a nozzle and a winder is exceeded in the "occupied resource allocation plan".

[1-3] Example of Operation

Next, an example of the operation of the server 10 in the system 1 configured as described above will now be described with reference to FIGS. 18 and 19.

Figure 18:
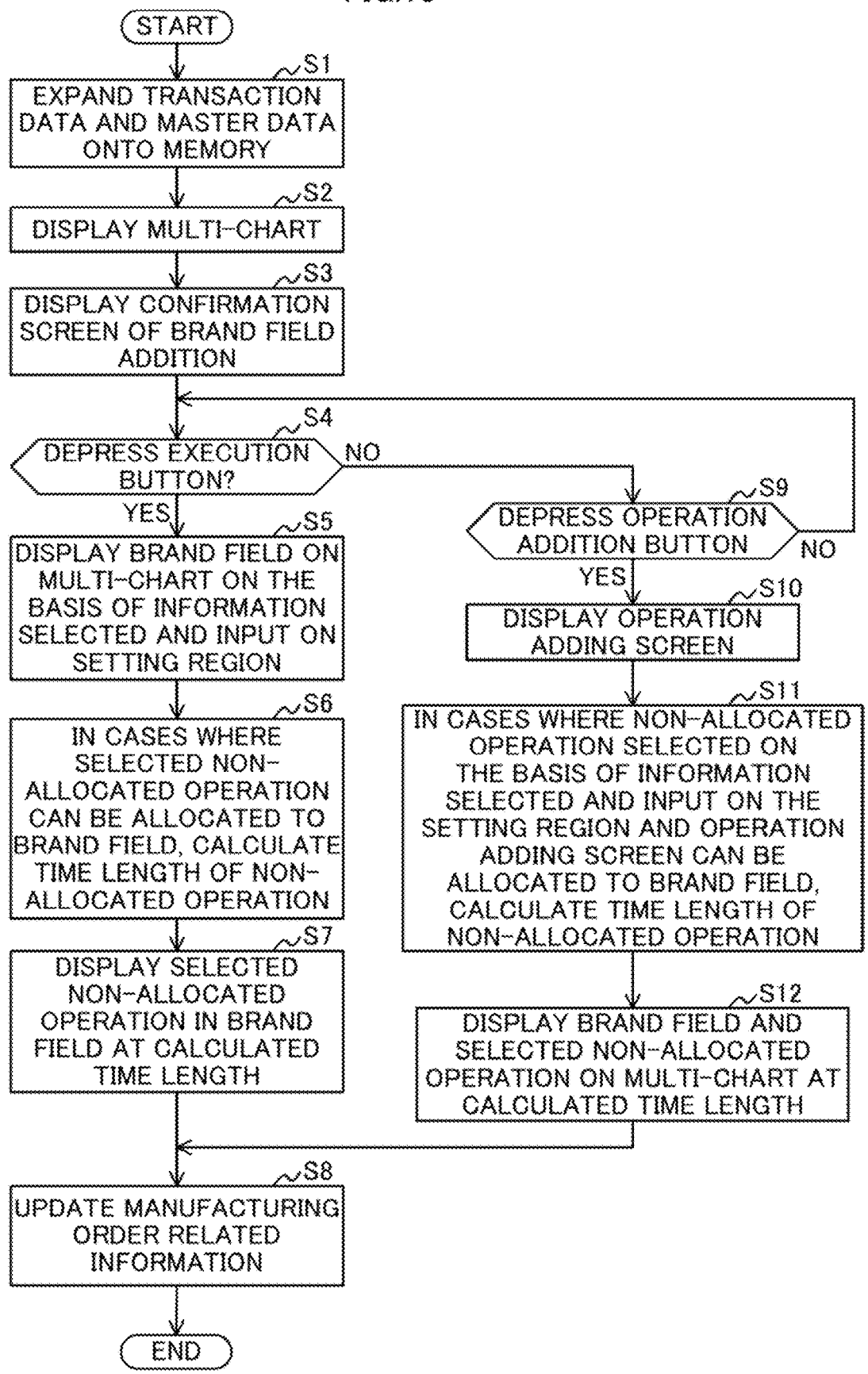
FIG. 18 is a flow chart for explaining an example of operation of an arranging process of a brand field and operations by a brand field generator.

FIG. 18 is a flow chart for explaining an example of operation of an arranging process a brand field 112 and an operation 113 by a brand field generator 15a. As illustrated in FIG. 18, the display controller 15 of the server 10 receives an instruction from operation receptor 13 in response to a request to generate a manufacturing plan from the terminal 20, and expands the item related information 11a, the non-allocated information 12a, and the manufacturing order related information 12b onto the memory 10b (Step S1).

Next, the brand field generator 15a displays the chart area 110 (e.g., a multi-chart) on the display area 100 of the display device 22 (Step S2; see FIG. 4). In addition, the brand field generator 15a displays a brand field addition confirmation screen 150 in response to the operator's operation on the chart area 110 (see the symbol A in FIG. 7) (Step S3; see symbol B in FIG. 7).

The brand field generator 15a determines whether the execute button 153 is depressed (Step S4). In cases where the button is depressed (YES in Sep S4), the brand field generator 15a displays an brand field 112 on the chart area 110 on the basis of the information selected and inputted on the setting area 151 (Step S5; see the symbol C in FIG. 7). The displayed widths of the brand field 112 may be determined based on any of the above-mentioned methods (a) to (d).

In cases where, for example, a non-allocated operation (see the symbol D in FIG. 10) selected in the non-allocated operation displaying area 130 is allocatable to the brand field 112, the brand field generator 15a calculates the time length of each operation 113 by, for example, proportional division (Step S6). Then, the brand field generator 15a displays the selected non-allocated operation in the brand field 112 at the calculated time length (Step S7; see the symbol E in FIG. 10). At this time, the brand field generator 15a may display an alert 115 (see FIG. 17) or the like based on various constraints.

The brand field generator 15a updates the manufacturing order related information 12b on the basis of the brand field 112 and the operations 113 allocated in the brand field 112 (Step S8), and then the process ends.

In Step S4, in cases where the execute button 153 is not depressed (NO in Step S4), the brand field generator 15a determines whether or not the operation addition button 152 (refer to the symbol B in FIG. 7) is depressed (Step S9).

In cases where the operation addition button 152 is not pressed (NO in Step S9), the process proceeds to Step S4, and the brand field generator 15a waits for depression of the execution button 153 or the operation addition button 152. In cases where the cancel button 154 is depressed, the brand field generator 15a may close the brand field addition confirmation screen 150 and waits for the operation made by the operator on the chart area 110.

In cases where the operation addition button 152 is depressed (YES in Step S9), the brand field generator 15a displays an operation addition screen 160 (Step S10; see FIG. 11).

In response to the depressing of the "OK" button on the operation addition screen 160, the brand field generator 15a determines the time length of the brand field 112 on the basis of the information selected and inputted on brand field addition confirmation screen 150 and the operation addition screen 160, for example, in any one of the above-mentioned methods (a) to (d). In cases where a non-allocated operation (see FIG. 11) selected on the operation addition screen 160 is allocatable to the brand field 112, the brand field generator 15a calculates the time length of each non-allocated operation by, for example, proportional division (Step S11).

The brand field generator 15a displays the brand field 112 based on the information selected and input on the brand field addition confirmation screen 150 and the non-allocated operation selected on the operation addition screen 160 on the chart area 110 at the calculated time length (Step S12; see the symbol E in FIG. 10). At this time, the brand field generator 15a may display the alert 115 (see FIG. 17) or the like based on various constraints. Then, the process proceeds to Step S8.

The brand field 112 and the operations 113 arranged in accordance with the above-described processing may be appropriately migrated, changed, deallocation, deleted, or the like as appropriate in response to the operation by the operator.

Figure 19:
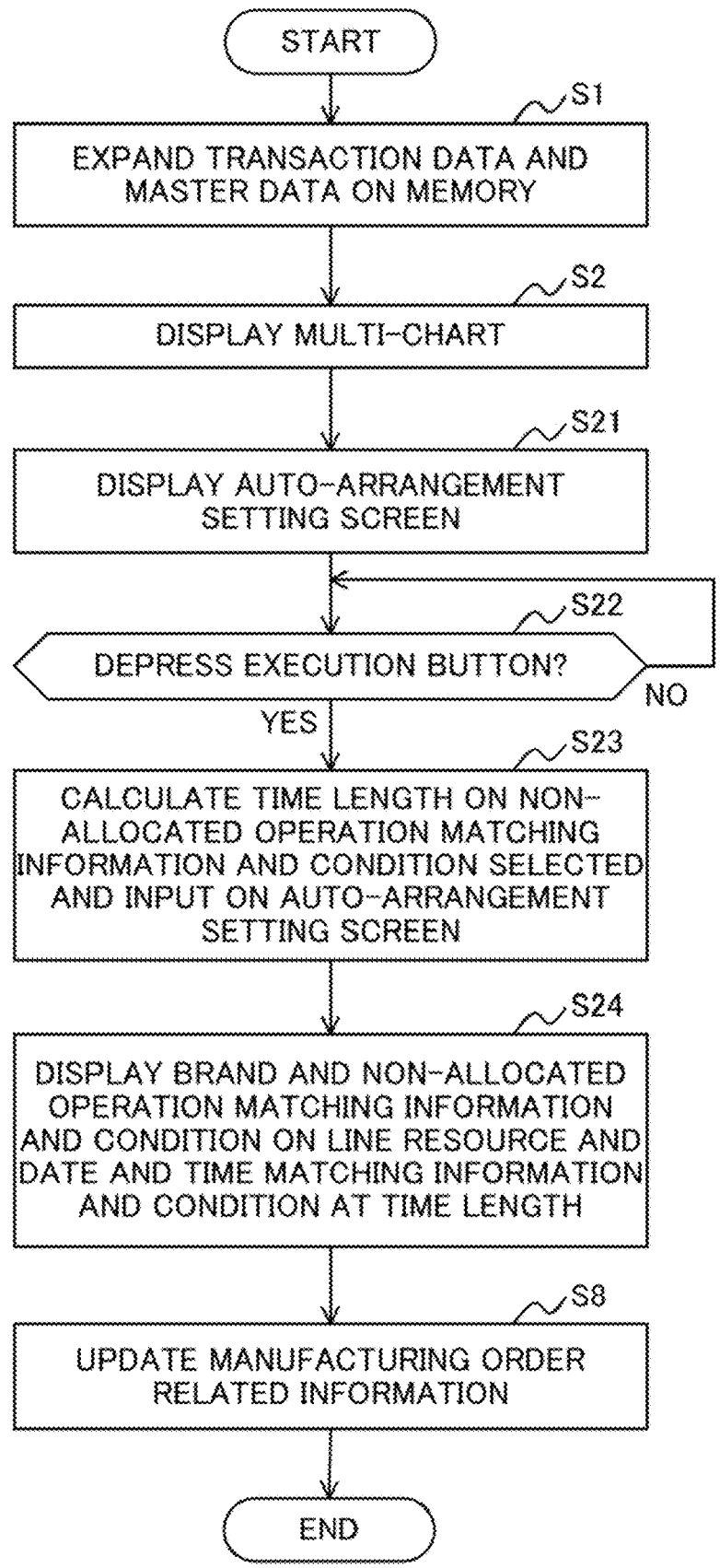
FIG. 19 is a flow chart for explaining an example of operation of the auto-arranging process of a brand field and operations by a plan arranger.

FIG. 19 is a flow chart for explaining an example of operation of the auto-arranging process of a brand field 112 and an operation 113 by a plan arranger 15b. In FIG. 19, Steps S1, S2 and S8 are the same as those in FIG. 18.

As illustrated in FIG. 19, the plan arranger 15b displays an auto-arrangement setting screen 180 in response to a request from the operator (Step 321; see FIG. 15).

The plan arranger 15b determines whether the execute button 184 is depressed (Step S22). In cases where the execution button 184 is not depressed (NO in Step S22), the process proceeds to Step S22, and the plan arranger 15b waits for depression of the execute button 184. In contrast, in cases where the cancel button 185 is depressed, the plan arranger 15b may close the auto-arrangement setting screen 180 and wait for operation by the operator on the chart area 110.

In cases where the execute button 184 is depressed (YES in Step S22), the plan arranger 15b notifies the brand field generator 15a of the information, the condition, and the like selected and input on the auto-arrangement setting screen 180.

The brand field generator 15a calculates the information and the time length of the brand field 112 that conform to the conditions based on the notified information and condition in any of the above-mentioned methods (a) to (d). In cases where a non-allocated operation matching the information and the condition can be allocated to the brand field 112, the brand field generator 15a calculates the time length of the non-allocated operation in any of the above-mentioned methods (a) to (d) (Step S23).

Then, the brand field generator 15a displays the brand field 112 and the non-allocated operation based on the notified information and condition in the chart area 110 at the calculated time length on the line resource and the date and time that based on the notified information and condition (Step S24; see FIG. 16). At this time, the brand field generator 15a may display an alert 115 (see FIG. 17) or the like based on various constraints. Then, the process proceeds to Step S8.

[2] Miscellaneous

The technique according to the one embodiment described above can be changed or modified as follows.

For example, the operation receptor 13, the outputting unit 14, and the display controller 15 (the brand field generator 15a and the plan arranger 15b) included in the server 10 illustrated in FIG. 1 may be combined in an arbitrary combination, or may each be divided.

The server 10 illustrated in FIG. 1 may have a configuration that achieves each processing function by multiple apparatuses cooperating with each other via a network. As an example, the operation receptor 13 and the outputting unit 14 may be a web server; the display controller 15 may be an application server; and the master DB 11 and the memory unit 12 may be a DB server, and the like. In this case, the processing function as the server 10 may be achieved by the Web server, the application server, and the DB server cooperating with each other via a network.

The one embodiment is described with reference an example of treatment in which the server 10 mainly arranges the brand field 112 in the chart area 110 with respect to the brand order, in other words, a slitting process. The system 1 according to the one embodiment may include, for example, a slitting process, a rolling process, and a resource procurement process in order of from a product to a material. For example, the system 1 may transition to previous or subsequent processes as appropriate to calculate requisite amounts between processes.

In the one embodiment, multiple items produced simultaneously by a slitting process are exemplified as the assortment, but the assortment is not limited to this. As described above, the assortment may be filling the same liquid into containers having different sizes or an LR article, an LCR article, or the like using molds.

In one aspect, the present invention may facilitate grasping of a production plan for multiple items to be produced simultaneously or continuously.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a displaying program for causing a computer to execute a process comprising:
   accepting production plans of a plurality of items;
   determining whether the plurality of accepted items are produced simultaneously or sequentially;
   when the plurality of items are determined to be produced simultaneously or sequentially, displaying a display component representing a material common to the plurality of items such that the display component indicates a time period containing the production plans of the plurality of items, and displaying display components associated with each of the plurality of items in a time period in which the display component representing the material is arranged.

2. The non-transitory computer-readable recording medium according to claim 1, wherein a length of the display component associated with each of the plurality of items is determined in accordance with information on a production amount of the item.

3. The non-transitory computer-readable recording medium according to claim 1, wherein a length of the display component representing the material is determined in accordance with a quantity set in a production plan of the display component representing the material and a capability of a production line on which the display component representing the material is arranged.

4. The non-transitory computer-readable recording medium according to claim 1, wherein a length of the display component representing the material is determined to be a production time of a production plan having a longest production time among a plurality of production times of the production plans of the plurality of items.

5. The non-transitory computer-readable recording medium according to claim 1, wherein a length of the display component representing the material is determined to be a longest production time of one of the plurality of items among a plurality of production times corresponding to the plurality of items.

6. The non-transitory computer-readable recording medium according to claim 1, wherein
the plurality of items are made from the one material;
a length of the display component representing the material is determined in accordance with a sum of a plurality of production times of the plurality of items or a sum of a plurality of production times of the production plans of the plurality of items, and a number of assortments of the plurality of items from the material.

7. The non-transitory computer-readable recording medium according to claim 1, wherein the plurality of items are produced from the one material.

8. A method for displaying executed by a computer, the method comprising:
accepting production plans of a plurality of items;
determining whether the plurality of accepted items are produced simultaneously or sequentially;
when the plurality of items are determined to be produced simultaneously or sequentially, displaying a display component representing a material common to the plurality of items such that the display component indicates a time period containing the production plans of the plurality of items, and displaying display components associated with each of the plurality of items in a time period in which the display component representing the material is arranged.

9. The method according to claim 8, wherein a length of the display component associated with each of the plurality of items is determined in accordance with information on a production amount of the item.

10. The method according to claim 8, wherein a length of the display component representing the material is determined in accordance with a quantity set in a production plan of the display component representing the material and a capability of a production line on which the display component representing the material is arranged.

11. The method according to claim 8, wherein a length of the display component representing the material is determined to be a production time of a production plan having a longest production time among a plurality of production times of the production plans of the plurality of items.

12. The method according to claim 8, wherein a length of the display component representing the material is determined to be a longest production time of one of the plurality of items among a plurality of production times corresponding to the plurality of items.

13. The method according to claim 8, wherein
the plurality of items are made from the one material;
a length of the display component representing the material is determined in accordance with a sum of a plurality of production times of the plurality of items or a sum of a plurality of production times of the production plans of the plurality of items, and a number of assortments of the plurality of items from the material.

14. The method according to claim 8, wherein the plurality of items are produced from the one material.

15. An information processing apparatus comprising:
a memory;
a processor connected to the memory, the processor being configured to:
accept production plans of a plurality of items;
determine whether the plurality of accepted items are produced simultaneously or sequentially;
when the plurality of items are determined to be produced simultaneously or sequentially, display a display component representing a material common to the plurality of items such that the display component indicates a time period containing the production plans of the plurality of items, and display display components associated with each of the plurality of items in a time period in which the display component representing the material is arranged.

16. The information processing apparatus according to claim 15, wherein a length of the display component associated with each of the plurality of items is determined in accordance with information on a production amount of the item.

17. The information processing apparatus according to claim 15, wherein a length of the display component representing the material is determined in accordance with a quantity set in a production plan of the display component representing the material and a capability of a production line on which the display component representing the material is arranged.

18. The information processing apparatus according to claim 15, wherein a length of the display component representing the material is determined to be a production time of a production plan having a longest production time among a plurality of production times of the production plans of the plurality of items.

19. The information processing apparatus according to claim 15, wherein a length of the display component representing the material is determined to be a longest production time of one of the plurality of items among a plurality of production times corresponding to the plurality of items.

20. The information processing apparatus according to claim 15, wherein
the plurality of items are made from the one material;
a length of the display component representing the material is determined in accordance with a sum of a plurality of production times of the plurality of items or a sum of a plurality of production times of the production plans of the plurality of items, and a number of assortments of the plurality of items from the material.

* * * * *